Figure 13:
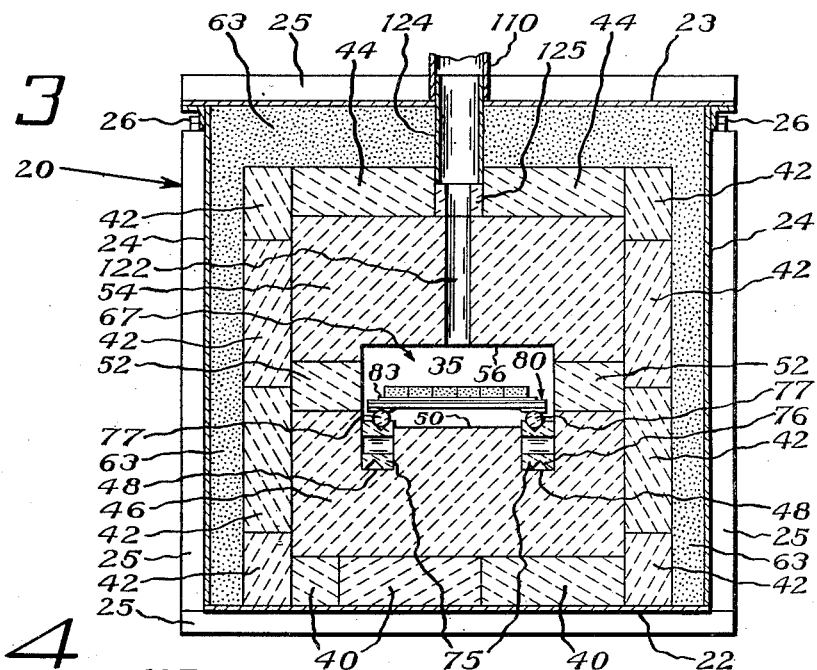

Dec. 12, 1950 W. L. HOWE 2,534,127
METHOD OF MANUFACTURING VITRIFIED GRINDING WHEELS
Filed May 10, 1947 7 Sheets-Sheet 1
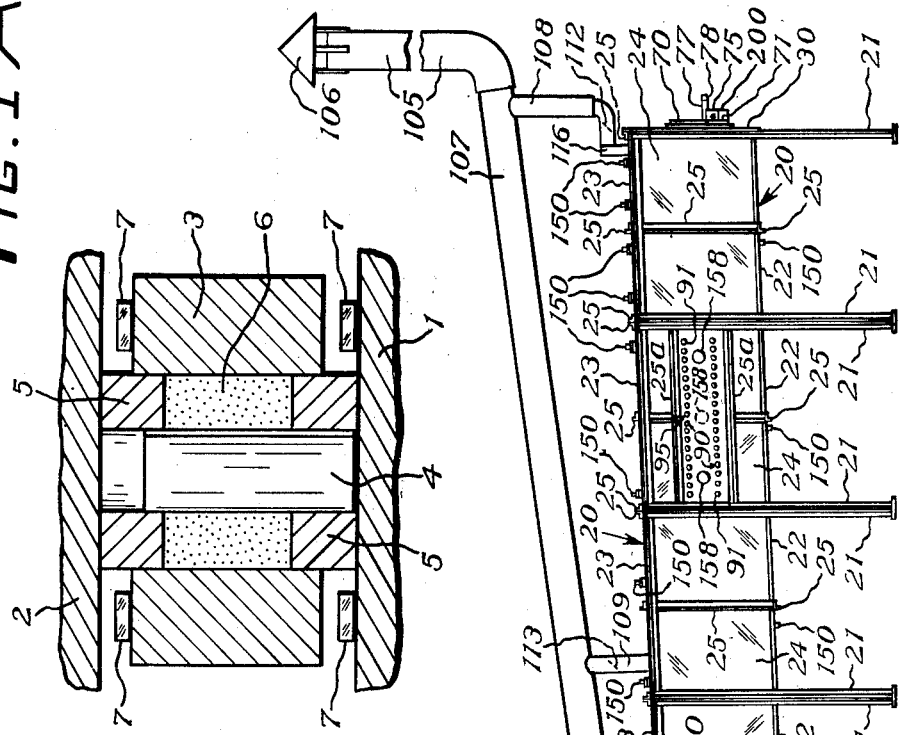
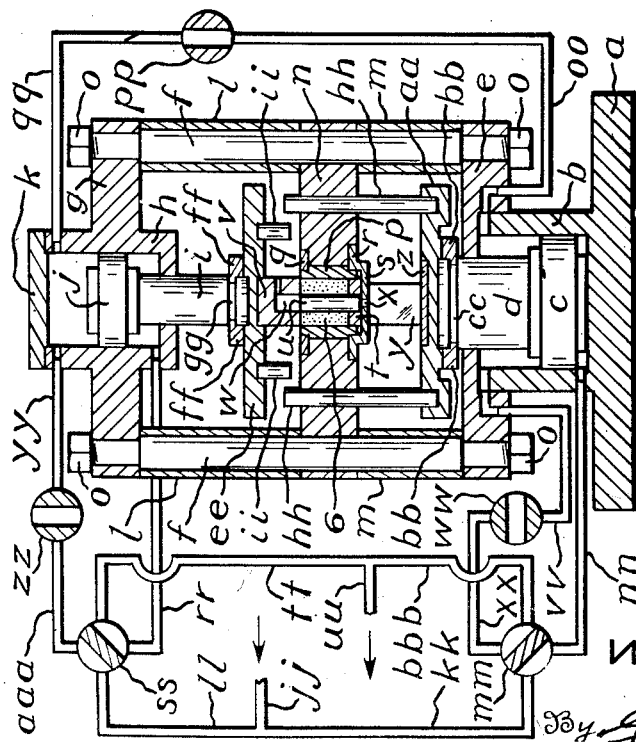
Inventor
WALLACE L. HOWE
By George Crompton Jr Attorney Dec. 12, 1950   W. L. HOWE   2,534,127
METHOD OF MANUFACTURING VITRIFIED GRINDING WHEELS
Filed May 10, 1947   7 Sheets-Sheet 2
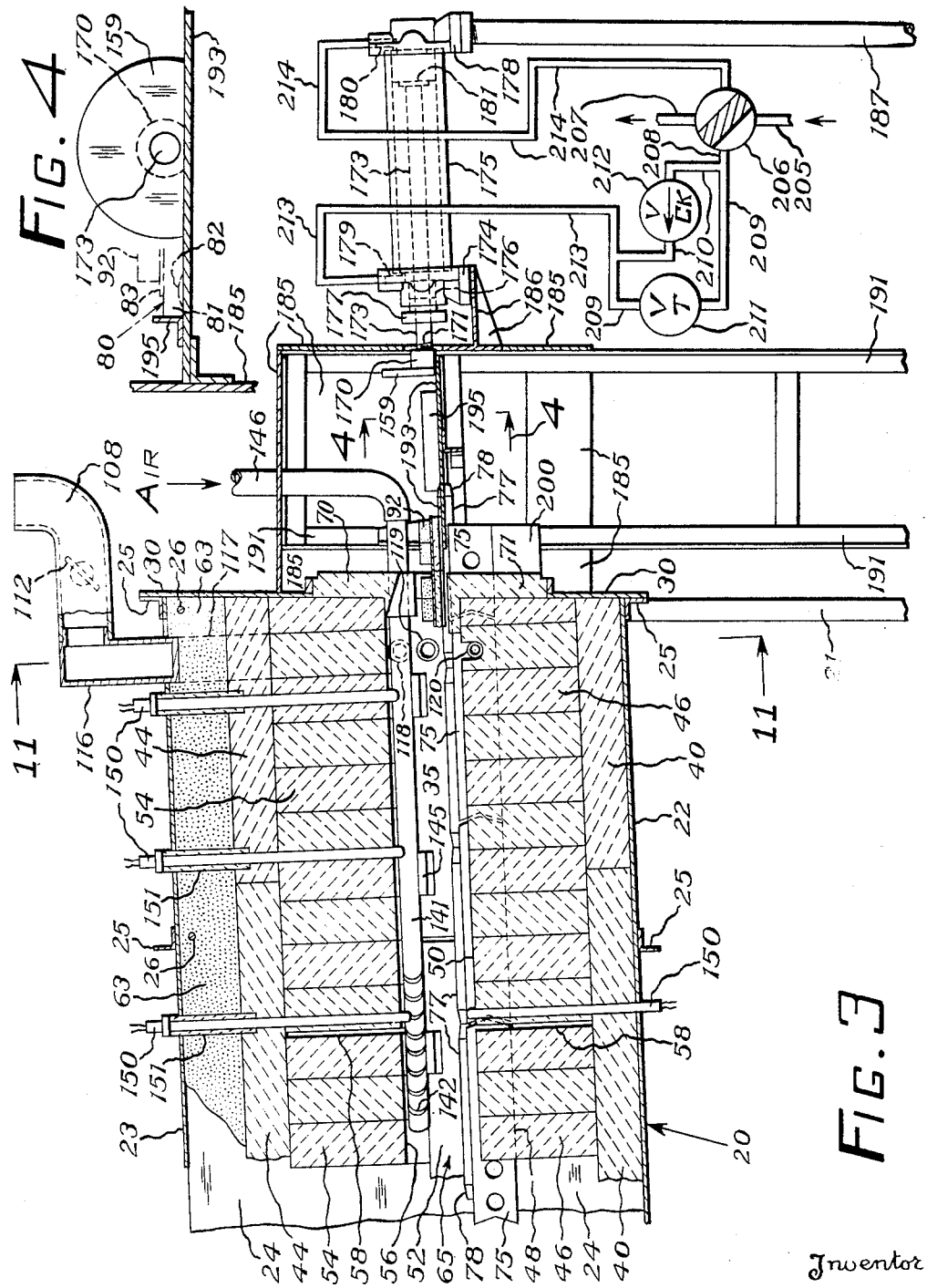
Inventor
WALLACE L. HOWE
By George (signature) Attorney

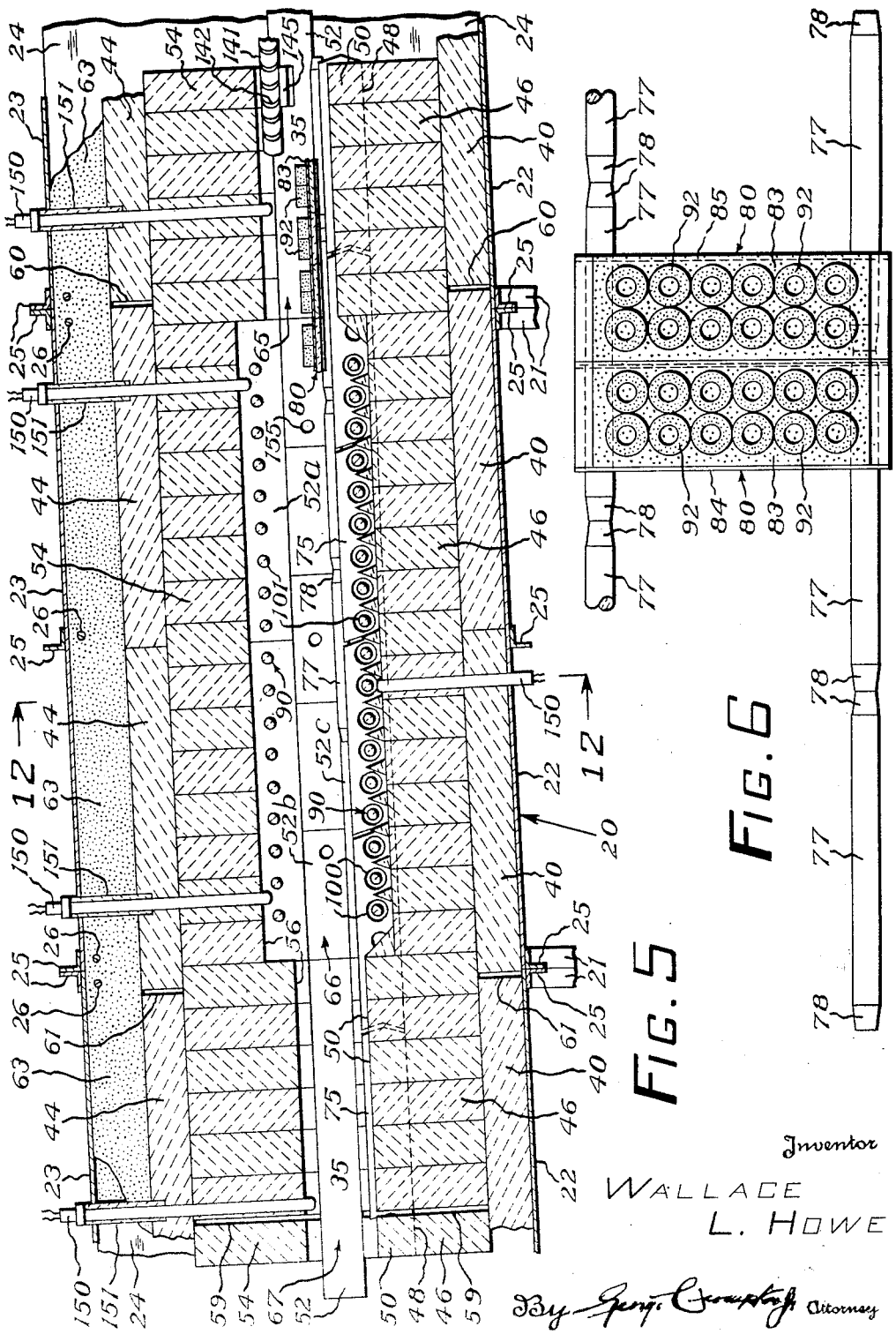

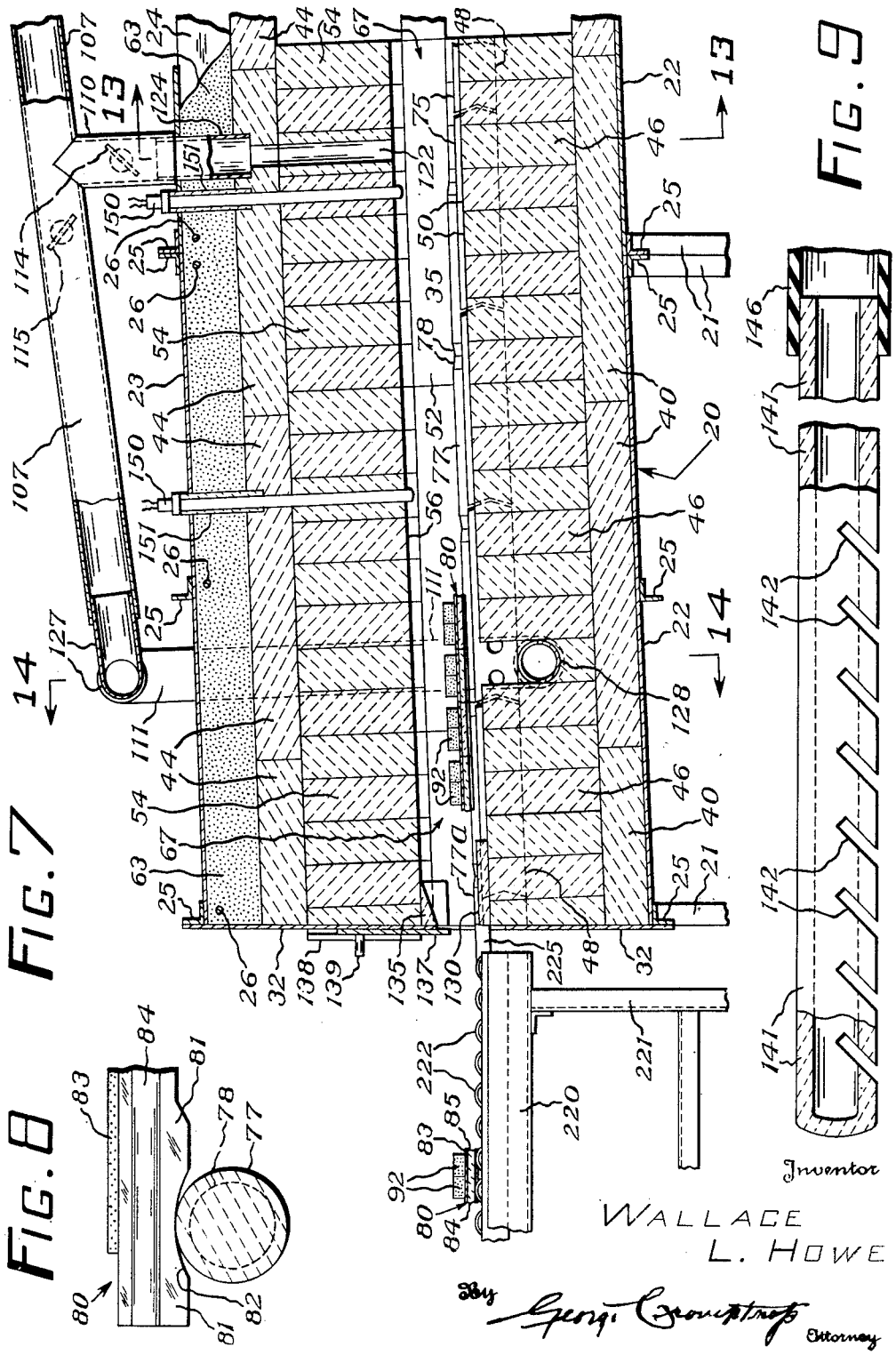

Dec. 12, 1950 W. L. HOWE 2,534,127
METHOD OF MANUFACTURING VITRIFIED GRINDING WHEELS
Filed May 10, 1947 7 Sheets-Sheet 5
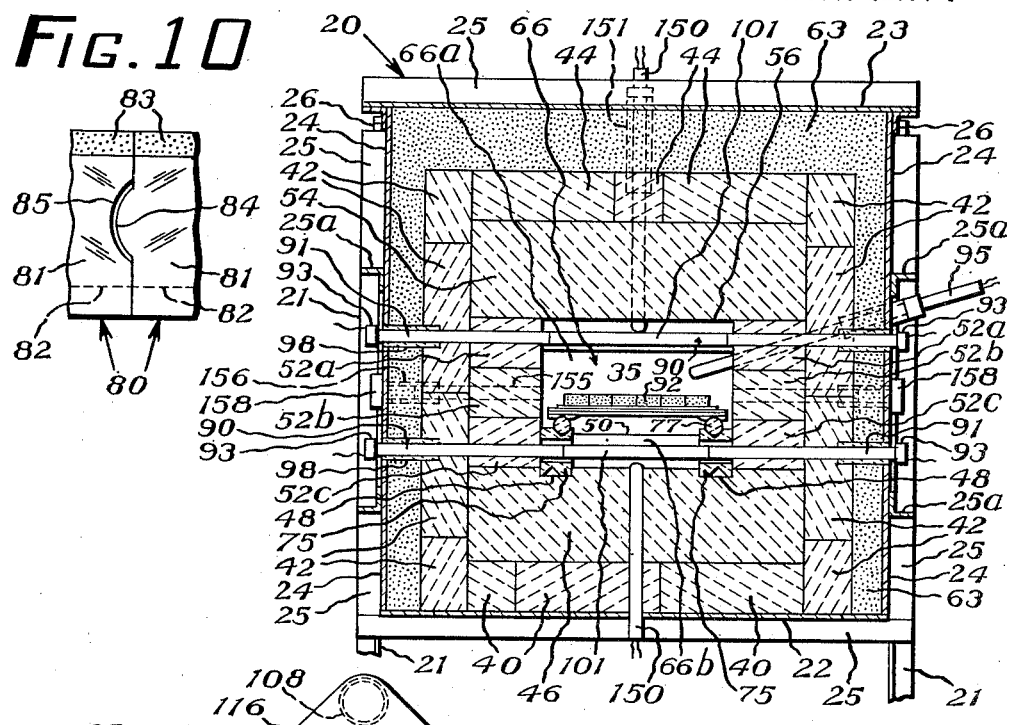
FIG. 10
FIG. 12
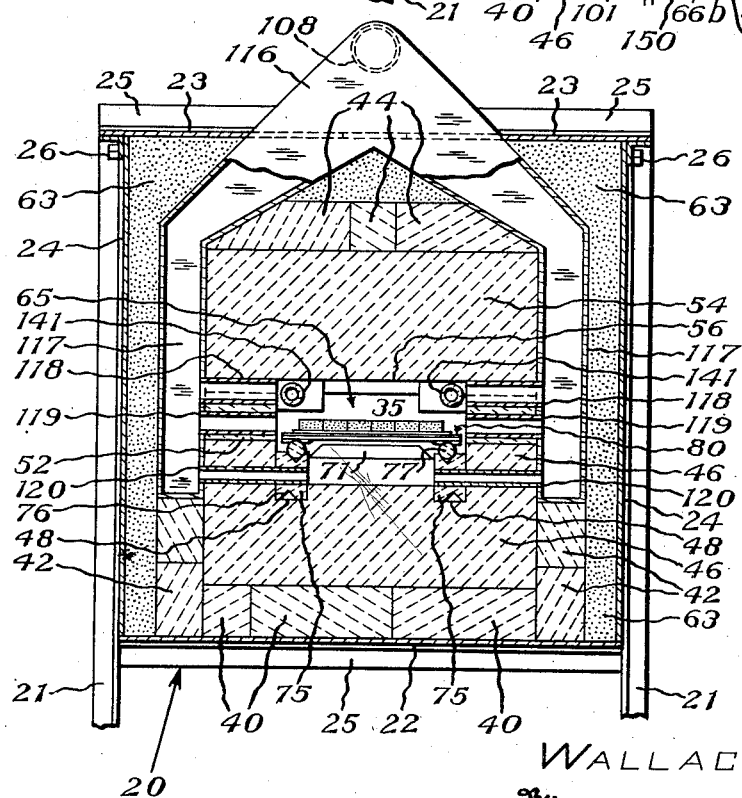
FIG. 11
Inventor
WALLACE L. HOWE
By George Crompton
Attorney Dec. 12, 1950     W. L. HOWE     2,534,127
METHOD OF MANUFACTURING VITRIFIED GRINDING WHEELS
Filed May 10, 1947     7 Sheets-Sheet 6

Inventor
WALLACE L. HOWE
By George Crompton, Attorney

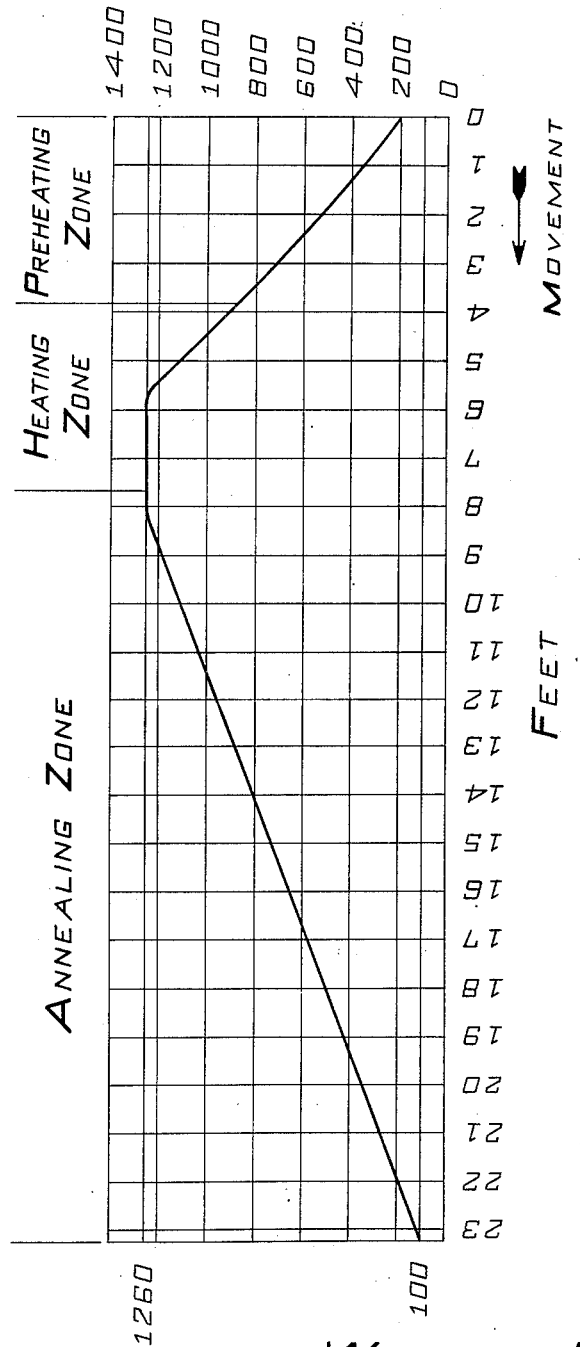

Patented Dec. 12, 1950

2,534,127

UNITED STATES PATENT OFFICE 2,534,127

METHOD OF MANUFACTURING VITRIFIED GRINDING WHEELS

Wallace L. Howe, West Boylston, Mass., assignor to Norton Company, Worcester, Mass., a corporation of Massachusetts Application May 10, 1947, Serial No. 747,171

34 Claims. (Cl. 25—156)

The invention relates to method of manufacturing vitrified grinding wheels. This application is a continuation in part of my copending application Serial No. 681,769, filed July 6, 1946, now abandoned. This application also embodies and claims the subject matter of copending and now abandoned applications Serial Nos. 139,135 and 139,136, each filed on January 17, 1950, as a division of application Serial No. 681,769.

One object of the invention is to increase the rate of production of vitrified grinding wheels. Another object is to enable vitrified grinding wheels to be manufactured more cheaply. Another object is to make stronger grinding wheels, which can therefore be run at higher speeds without breakage or without violation of the factor of safety regulations. Another object of the invention is to produce vitrified grinding wheels in quantity which have little or no strain therein. Another object is to manufacture strong grinding wheels with no strain by automatic machinery. Another object is to produce vitrified grinding wheels of substantial thickness which will grade the same on both sides. Another object is greatly to shorten the length of time required in vitrifying grinding wheels and other articles.

Another object of the invention is to provide an improved method for the manufacture of grinding wheels involving the combination of a dry granular mix and a pressing operation of such characteristics that the "green" pressed wheels will be absolutely uniform in structure and density and permitting the duplication of results in the manufacture of thousands of grinding wheels to very close tolerances. Another object is to provide an improved method for the manufacture of grinding wheels involving the combination of a dry granular mix and a firing operation of such characteristics that the fired wheels will have no strain and be of exceptional strength. Another object is the provision of a method involving (1) the use of a dry granular mix of great plasticity, (2) a pressing operation that, utilizing such mix, produces a green wheel of homogeneous characteristics and (3) a firing operation that vitrifies evenly throughout the mass, so that thousands of wheels to the same exact size can be produced, all of which wheels are without strain, grade the same on both sides, are homogeneous as regards density, grade and structure, and have exceptional strength. Another object is the provision of a method involving (1) the use of a dry granular mix of free flowing characteristics and (2) a firing operation that heats all areas of a disc shaped wheel evenly, so that grinding wheels can be quickly molded and quickly fired. Another object is to provide a plastic dry granular mix and a method of firing of such characteristics that grinding wheels can be molded and then fired without any intervening drying operation.

Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

Figure 14:
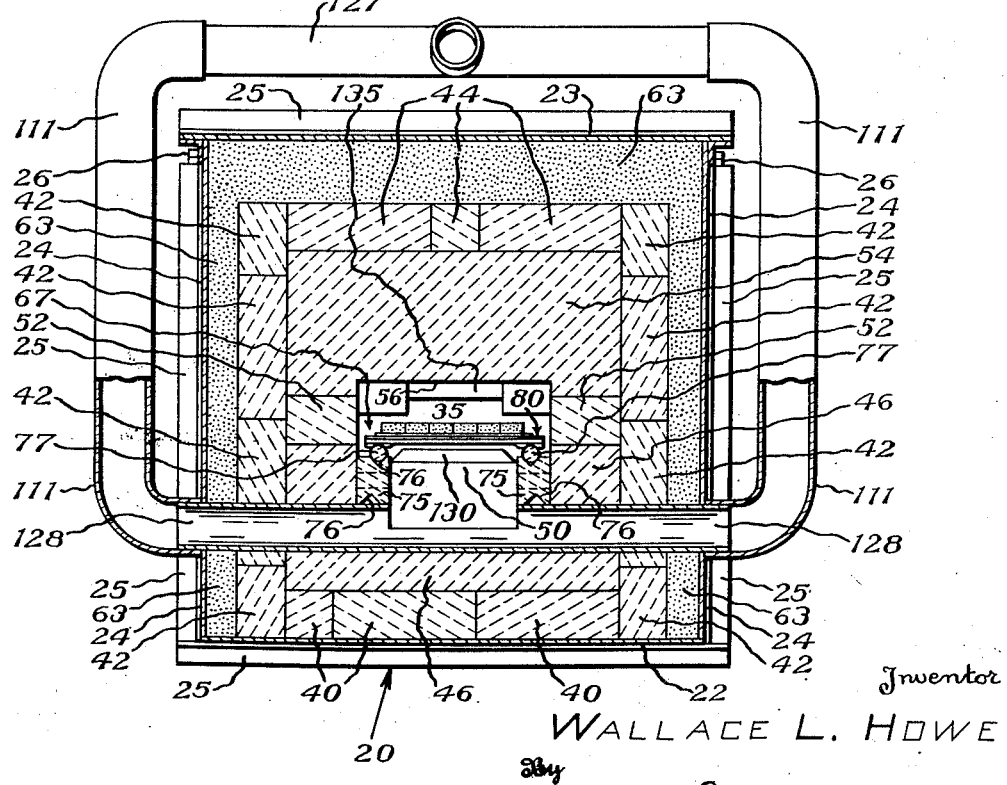

In the accompanying drawings illustrating a tunnel kiln and apparatus for molding and pressing grinding wheels:

Figure 1A is a sectional view of a conventional mold for pressing a grinding wheel, Figure 1B is a sectional view of a mold and pressing apparatus which is preferably used in the method of and to produce the article of this invention, Figure 2 is a side elevation of the kiln, Figure 3 is a fragmentary vertical central sectional view on an enlarged scale of the entrance end and preheating zone of the kiln showing also the propelling or charging mechanism for intermittently propelling the batts through the kiln, Figure 4 is an elevation of the front end of the batt propelling ram, the view being taken from the line 4—4 of Figure 3 looking in the direction of the arrows, Figure 5 is a fragmentary vertical central sectional view of the kiln showing the heating zone and parts of the preheating and annealing zones, the scale being the same as that of Figure 3, Figure 6 is a plan view of a pair of series of refractory rods upon which the batts rest and are propelled in the kiln tunnel, showing a couple of batts thereon, the view being on a larger scale than that of Figures 3 and 5, Figure 7 is a fragmentary vertical sectional view of the kiln showing the annealing zone and exit end, the scale being the same as that of Figures 3 and 5, the view also showing part of the receiving table in elevation, Figure 8 is a fragmentary elevation of a batt and a cross sectional view of a refractory rod on a scale considerably larger than that of Figure 6, Figure 9 is a view partly in axial section and partly in elevation of a refractory air delivery tube and hose connected thereto, on a large scale, Figure 10 is a fragmentary side elevation of a pair of batts showing the interlocking thereof, on a scale larger than that of Figure 8, Figures 11, 12, 13 and 14 are transverse (nearly vertical) sectional views through the kiln taken respectively on the lines 11—11 of Figure 3, 12—12 of Figure 5, 13—13 and 14—14 of Figure 7, on the same scale as these figures.

Figure 15 is a graph of the movement of the ware (wheels) through the kiln showing the temperature of the kiln at each point in the tunnel.

Vitrified grinding wheels according to the invention may be made out of any refractory abrasive and any vitrifiable bond. The abrasive should be refractory so that it will not melt or fuse during the vitrifying operation. The temperature of vitrifying is dependent upon the particular bond used, and the abrasive is refractory for the manufacture of a wheel with a particular type of bond if the abrasive will not melt or fuse during the vitrification of such bond.

Consequently the abrasive can be diamond since vitrifiable bond for the manufacture of diamond grinding wheels is now known. A good example thereof is disclosed in the U. S. patent to Lombard and Milligan, No. 2,309,463. However grinding wheels according to the invention will be made in greater quantities with various varieties of alumina and with silicon carbide. Both of these are refractory. Varieties of alumina include emery, which is a natural alumina but relatively impure, corundum, which is a natural alumina but considerably purer than emery, and the products of the electric furnace. The products of the electric furnace in turn include the so-called "regular" alumina which is a brown variety about 95% pure, the white porous variety which is made by fusing chemically precipitated alumina, and newer types such as alumina made in discrete crystals as disclosed in U. S. Patent Re. 20,547 to Ridgway.

Varieties of silicon carbide include the ordinary black variety and the relatively pure green variety. The invention however is not limited to the use of diamonds, alumina and silicon carbide since any other refractory abrasive may be used.

The vitrifiable bond may be a mixture of clays and rocks, or a single clay and a single rock, or all clay or all rock, or frits may be used. As an example 20 parts of ball clay and 50 parts of Albany slip clay and 30 parts of feldspar, all by weight, are thoroughly dried, crushed, ground and screened. I may use the above or I may use more recently developed bonds as to which I will refer to the patents which describe them. U. S. Patent No. 1,829,761 to Saunders, Milligan and Beecher granted November 3, 1931 describes an excellent vitrifiable bond especially for the manufacture of wheels with fused alumina abrasive. U. S. Patent No. 2,158,034 to Milligan and Lombard, dated May 9, 1939, describes an excellent bond for the manufacture of wheels using silicon carbide abrasive. U. S. Patent No. 2,309,463 has already been mentioned as describing an excellent bond mixture for the manufacture of wheels with diamond abrasive. Many other bond mixtures for the manufacture of vitrified bonded abrasive products will be found in the patent literature, and I am not limited therein since any vitrifiable bond may be used.

With regard to the quantity of bond to be used, this depends upon the grit size of the abrasive and structure of the grinding wheel to be achieved. Full instructions for the manufacture of abrasives of closely controlled structure are set forth in the U. S. patent to Howe and Martin, No. 1,983,082, dated December 4, 1934. Accordingly, while the quantity of bond is certainly an important matter, this is a variable function of the volume percentage of abrasive and bond and is now well known to the art, so in practicing the present invention I use an amount of bond as desired to produce the desired structure. The relative volume percentages of abrasive, bond and pores depend not only on the weight percentage of abrasive and the weight percentage of bond but also on the amount of compacting of the mixture of abrasive and bond. This is a function of the molding technique and may be controlled as will shortly appear.

In accordance with this present invention I form a dry granular mix of the abrasive grains and vitrifiable bond which is highly plastic and (paradoxically) also free flowing. To produce this plastic free flowing dry granular mix I may proceed as follows.

I provide an abrasive mixing machine of any variety known to the art. Many varieties of mixer are known in the abrasive industry. In general these machines involve a container and something to stir the contents of the container. I prefer the type known as a vertical spindle mixer which consists of a vertical spindle, which is rotated, on top of which is fixed a disc-like table which removably holds a large open top pan into which the abrasive is charged. This mixer further has one or more stationary plows which are lowered into the pan. The rotation of the pan and the stationary plows therein cause the granular abrasive material to flow in tortuous paths so that a thorough mixing is achieved.

I next provide a quantity of vitrifiable bond as above described. The particles of this bond are small and should be not larger than one third of the size of the abrasive grains dimensionally. This bond should be very dry and is placed in a hopper with a vibrator so that it can be sifted into the pan. When the clay, rock, mineral or frit, or combination thereof is thus sifted into the mixing pan which contains the abrasive and which is turning, a thorough mixture of abrasive and bond results. But no attachment of the bond to the abrasive grain will occur unless a further ingredient is added.

According to this invention, before the bond powder is added to the abrasive, I first add the special agent which in one particular embodiment thereof is a wax emulsion. This, for example, may consist of 50% of a ceresin wax having a melting point of from 165° F. to 170° F. thoroughly emulsified to a creamy consistency with water and emulsifying agent, percentage being by weight. This wax since it has a melting point of from 165° F. to 170° F. will not soften during a hot day when, for example, the temperature of the mixing room may rise to 110° F. Any wax having a melting point about 130° F. will serve, but I prefer a wax having a melting point above 150° F. There are many waxes so I should not be limited to particular ones. Further examples of usable waxes will be given hereinafter. Ceresin wax is micro crystalline.

Accordingly, after the abrasive is placed in the mixing pan, the plows lowered into position and the switches closed so that the electric motor rotates the pan, I add a quantity of the above-described wax emulsion. I prefer a quantity of around 6% by weight of the wax emulsion based on the weight of the abrasive in the pan. However this may be varied from around 3% to 15%. In general with the smaller particle size of abrasive I use more of the wax emulsion. For mixtures of about 60 grit size with a small amount of bond, 6% of the wax emulsion is the best proportion now known to me, whereas with fine grit sizes such as 220 and a large amount of bond I prefer to use about 12% of the wax emulsion based upon the weight of the abrasive.

Mixing should be continued for about two minutes. This gives good results with the vertical spindle mixer rotating at 45 R. P. M. It is not detrimental to continue the mixing for a longer time up to twice or three times the foregoing, so if another mixer is used I would recommend a longer period, for example, 10 minutes since this will not be detrimental and may be desirable.

I now add the bond while the pan is still rotating and the mixing is therefore continued. As above stated, the bond is slowly sifted into the mixing pan and I continue until all the bond is in the pan and for about three minutes thereafter. The length of time of mixing is dependent upon the revolutions per minute of the pan and the weight of the abrasive charge. For example, I might use a charge of abrasive of about 20 pounds in a twenty inch diameter pan and a speed of around 45 R. P. M. for which a mixing time of three minutes after the bond is all in the pan is satisfactory. Provided the pan is large enough to hold the abrasive without overloading, the plows are adequate, and the speed in R. P. M. is the same, the mixing time is about the same whether the charge of abrasive be large or small.

As the result of the foregoing mixing there is produced a dry granular mix the characteristic of which is that every abrasive grain is coated with wax emulsion and bond, the wax emulsion and bond are thoroughly mixed, and there is no surplus of either wax emulsion or bond which is not coated onto an abrasive granule. This mix however is not very dry. According to the invention the granular mix is now dried.

After mixing as above described the mix or a quantity thereof is dried at a temperature of about 185° F. The temperature should be at or slightly above the melting point of the wax in order to improve the uniformity of the mixture of bond and abrasive. With regard to the time, so long as the temperature is kept at the limit indicated or below additional time does no harm. This drying eliminates practically all of the water from the wax emulsion at least down to .1% or .5% of water on the total wax plus water. The abrasive grains are now coated with dry wax and dry vitrifiable bond thoroughly mixed and there is no surplus thereof.

The mix is now carefully screened. If the grit size of the abrasive was 60, this will be increased to about 32 grit size by the addition of the wax and bond. In such case a screen of 32 meshes to the linear inch should be used. A finer screen may cause an unmixing, and a coarser screen will allow a cluster of two or more granules to pass through.

After the mix has thus been dried and screened, it is recharged into the clean pan of the same or a similar vertical spindle mixer. The pan is set in rotation, the plows are lowered, and then a small quantity of anti-sticking agent is added. Usually I prefer about one half of one percent by weight based on the weight of the dry granular mix. This may range from one quarter of a percent to 2% but I have had the best results using one half percent.

The anti-sticking agent which I now prefer is lycopodium powder. This is a fine yellow resinous water repellant powder consisting of the spores of various species of Lycopodium, especially *Lycopodium clavatum*. The lycopodium plants are more familiarly termed club mosses.

The mixing is continued after all the anti-sticking agent is added for about one half minute and it is undesirable to continue much longer. A shorter time would give some results but little is gained from being niggardly in this respect. The mixing is now completed and the mix may be dumped and used as desired. I have not found that any further screening is necessary but if lumps do occur, further screening would be indicated.

Thus each particle of the dry granular mix consists of a central nucleus of hard refractory abrasive, such as silicon carbide or fused alumina, coated with a thorough mixture of dry vitrifiable bond powder and a dry adherent wax, this coating forming an envelope enclosing the abrasive, with a further very thin coating of an anti-sticking agent which adheres to the waxy particles of the adherent wax by reason of a slight stickiness of the latter, but which offers no adhering attraction for other units by reason of the non-adhering qualities of the anti-sticking agent. Likewise the anti-sticking agent repels water.

While I prefer lycopodium powder, other anti-sticking agents might be used. The advantages of the lycopodium powder are that it is highly inflammable but leaves no ash, and it has no adherent qualities of its own, and it is finely divided. It burns out and passes into gases during the firing of the article in the kiln and in no way contaminates the bond. Good results can be obtained by using aluminum powder, very fine, as an anti-sticking agent, since this is compatible with most vitrifiable bonds. The aluminum, during firing, will combine with oxygen to form alumina, and this is absorbed into the bond, increasing slightly the content of alumina thereof, but since the increase is slight and the bond usually contains alumina, this can be tolerated. As a refinement, the amount of $Al_2O_3$ in the bond can be lowered so that, when the alumina from the aluminum used as an anti-sticking agent is added, the total $Al_2O_3$ will be according to the bond formula. However this causes calculations to be made for various mixes, bonds, grit sizes, etc.

In like manner, since most metals are anti-sticking and will form oxides, other metals can be used. Boron, since boric oxide, $B_2O_3$, is a constituent of most vitrifiable bonds, could be used, but elementary boron is hard to obtain and is expensive. Sodium and potassium are obviously unsuitable. Copper could be used but would add an undesired oxide to the normal bond; nevertheless since the quantity would be small it might be tolerated. The same applies to bronze and brass powders.

Various other organic substances besides lycopodium powder could be used as anti-sticking agents. Any organic which will burn without leaving ash, which is not hygroscopic or deliquescent, which can be ground very fine, and which has no stickiness, may be used. Starch and zinc stearate are examples.

Talc and the like can be used. Mica could be used. If minerals are used (including metals) the structure should be flake-like. Otherwise it is necessary to grind them much finer. However very finely ground glass would be satisfactory. Silica can be ground very fine and is usable. All of the minerals mentioned in this paragraph are compatible with many vitrifiable bonds and the formulae of the bonds can be adjusted in most cases to obtain the desired formulae after firing, or in many cases the amount of the added material is so small as to be inconsequential. In the latter category is graphite which can be used.

During the pressing operation the coating of the anti-sticking agent is ruptured and the bond made adhesive by the wax sticks together, joining granule to granule and forming a compact integral "green" article which can be readily handled. Prior to the pressing, however, the granules will not stick to each other nor to the parts of the machine, nor will they attract moisture.

As previously stated waxes other than micro crystalline wax can be used. Under some conditions any wax having a melting point above 130° F. can be used, but in most cases the wax should have a melting point above 150° F. and it is better that the melting point be 165° F. or above. The table is a list of waxes that can be used, showing the origin of the wax and in some cases its general chemical composition and indicating its melting point.

organic solvents such as petroleum ether, chloroform or acetone. However the water soluble wax is less soluble in these organics and consequently I prefer to use any of the others in the table. Any of these solvents can be readily driven off by the fourth step in the process which becomes a solvent evaporating step using either a belt conveyor adjacent to a source of heat or an oven.

Still another modification of the process can be used. I may melt the wax and add it to the abrasive in molten condition. Practically any wax can be melted including all those listed in the table. When carrying out the process in this manner it is desirable and in many cases necessary as a practical matter to heat the abrasive grain. It is preferable to heat the abrasive grain to about the melting point of the wax. Thus, proceeding in this manner, I may first heat the abrasive grain to the desired temperature and at the same time melt the wax. Then the mixing machine is charged with the abrasive grain and preferably the mixing pan and the grain are kept hot as by the use of a heating lamp. Now, while the machine is in operation, the liquid wax is added. When the wax has coated all the granules, the bond is added while continuing the mixing. It is desirable that the bond also be heated before it is added to the pan.

*Table*

| Wax | Origin | Chemistry | Melting Point |
| --- | --- | --- | --- |
| Carnauba | Vegetable | Fatty Acid Glyceride | 183° F. |
| Japan wax | do | do | 130° F. |
| Ceresin | Mineral | Hydrocarbon | Around 170° F. |
| Montan | do | do | 175° F. |
| Paraffin | do | do | Various. |
| Halowax | Synthetic | Chlorinated Diphenyl | 194° F. |
| Rilan wax | do | Chlorinated Hydrocarbon | 183° F. |
| Acrawax | do | Amide Fatty Acid and Ethylene Diamine. | 275° F. |
| Water Soluble Wax. | do | Poly Ethylene Glycol (Molecular Weight 4,000). | 130° F. |
| Beeswax | Animal | Fatty Acid Glyceride | 130° F. |
| Candellila | Vegetable | do | 130° F. |

The particular special agent which is now preferred is a water emulsion of a ceresin wax which consists of 50% of ceresin wax by weight emulsified with 42% by weight of water with 8% of triethanolamine stearate as an emulsifying agent. Other emulsifying agents could be used and many are known to the art. Most of them will pass off without leaving any ash when placed in a vitrifying kiln.

Other methods of treating the material to incorporate the wax in the bond may be employed. I can use a water soluble wax which may be dissolved in water with reasonable stirring. The procedure when using a water soluble wax is first to charge the mixing pan with the abrasive and start the mixing machine in operation; second, add the desired quantity of the wax dissolved in water and continue the mixing until all the grains are coated with the solution; third, sift in the bond while continuing the mixing; fourth, after the grains are coated with bond as well as wax, dump the mixture and dry it in an oven or on a belt conveyor; fifth, screen the mixture until each granule coated with bond and wax is a distinct particle; sixth, recharge the screened mix into a clean mixing machine and set the machine in operation; seventh, sift in the anti-sticking agent while continuing the mixing.

The above described procedure may also be used with waxes dissolved in an organic solvent. All the waxes in the table may be dissolved in Then the mixture is dumped and cooled, and when it is near room temperature it is screened, then recharged into a clean mixing pan and the anti-sticking agent is added while the mixer is in operation.

One important feature of the dry granular mix according to the invention is that it is free flowing. Yet it is also highly plastic. Using the wax first described and the lycopodium as an anti-sticking agent, the mix has an angle of repose of about 30°. The dry granular mix made in accordance with the various embodiments of this invention, is sufficiently free flowing to enable automatic molding machines to operate continuously, producing pressed green abrasive articles and the like which are uniformly accurately dimensioned and have the same weight and the same volume structure. It is possible, using the dry granular mix described, molding it in an automatic molding machine and then firing the green articles, to produce grinding wheels which in diameter thickness and size of the central hole vary from each other by no more than two or three thousands of an inch. Thus no truing operation on the grinding wheels is required and they are made to closer tolerances than was heretofore considered commercially practicable.

Another feature of the free flowing dry granular mix hereof is that pieces molded therefrom may be immediately fired without any intervening drying or baking operation after molding. This saves a great deal of handling of the pressed pieces, it saves time and labor, and it avoids the accumulation of inventory.

Referring now to the drawings, for molding and pressing a wheel I may use the apparatus illustrated in Figure 1A. This involves a press, such as an hydraulic press, the details of which need not be described herein. Such a press has a bottom platen 1 which is stationary and an upper platen 2 which is movable towards and away from the stationary platen 1. I provide a mold comprising a mold band 3 in the form of a hollow cylinder of steel, a mold arbor 4, which is a cylindrical piece of steel, and a pair of mold plates 5 each of which is shown as a cylindrical ring of steel. For the manufacture of various shapes of grinding wheels the shapes or relative dimensions of the mold band, the arbor and the plates will vary as is known in the art, and other materials may be used although steel is preferred. This mold is filled with the free flowing plastic dry granular mix 6 and in Figure 1A the mold is ready for the pressing operation. Pressing should preferably be done to give a predetermined and fixed volume of the pressed article as distinguished from a predetermined or fixed pressure exerted and I therefore show stops 7 which may be simply blocks of iron or steel to limit the pressing operation. However so far as the present invention is concerned pressing may be done to a fixed pressure.

When the upper platen 2 is moved downwardly, the mix 6 will be compressed. This forms the mix into a so-called "green" wheel. This green wheel is then removed from the mold in a manner known to the art and is ready for firing in the kiln of the invention. As the result of firing in accordance with this invention, a superior grinding wheel is produced as will be more fully explained hereinafter.

While, so far as certain features of the invention are concerned, the wheels may be pressed as above described with apparatus such as illustrated in Figure 1A, I prefer to use molding and pressing technique which will now be explained by reference to Figure 1B. Thereby still better wheels can be produced. Referring now to Figure 1B, there is therein shown a press comprising a base $a$ having integrally formed thereon a hollow cylinder $b$ in which is located a piston $c$ having a piston rod $d$. The piston rod $d$ extends through a cylinder head $e$ which is connected by rods $f$ to a plate $g$ in the center of which there is a hollow cylinder $h$ which may be integral with the plate $g$. Through the bottom of the cylinder $h$ extends a piston rod $i$ on which is a piston $j$ located in the cylinder $h$. A cylinder head $k$ closes the top of the cylinder $h$.

Surrounding the rods $f$ are sleeves $l$ and $m$ which serve to hold apart the head $e$ and the plate $g$ and which also position and secure a plate $n$ through which the rods $f$ pass. This entire structure including the head $e$, the plates $g$ and $n$, the rods $f$ and the sleeves $l$ and $m$ is secured together by nuts $o$ on the ends of the rods $f$. The head $e$ is secured to the cylinder $b$ as by being screwed thereon. Thus it will be seen that the cylinders $b$ and $h$ and the plate $n$ are rigidly positioned in fixed spaced relation. The cylinders $b$ and $h$ are coaxial.

Fixed in the plate $n$ and located coaxial with the cylinders $b$ and $h$ is a cylindrical mold band $p$. It may be secured in place by a press fitted ring $q$ at the top and by a press fitted ring $r$ at the bottom, the ring $r$ having an integral bar $s$ diametrically across and under it for a purpose to be explained. Fitting in the mold band $p$ and above the bar $s$ is a bottom mold plate $t$ having a central hole through which passes a mold arbor $u$. At the upper end of the mold band $p$ is a top mold plate $v$. This mold plate $v$ is of a size and shape to enter the mold band $p$ and to form a close fit therewith. The mold plate $v$ likewise has a central hole $w$ into which the arbor $u$ may extend. The arbor $u$ is a fixed arbor since it has a reduced portion $x$ which is pressed fitted into a hole in the bar $s$.

The mold plate $t$ moves with the piston rod $d$. In this illustrative embodiment of this invention the mold plate $t$ is formed as an integral part of a pair of integral extensions $y$ of a plate $z$ which is removably secured to a plate $aa$. The plate $aa$ is connected to the piston rod $d$ by means of a pair of half collets $bb$ which are suitably secured to the plate $aa$ and which fit in a groove $cc$ formed in the piston rod $d$. Thus, the mold plate $t$, which in shape is a disc with a hole in it, moves whenever the piston rod $d$ moves but the bar $s$ which holds the arbor $u$ is unaffected by movement of the plate $t$ since it is located between the extensions $y$. To mold other sizes of wheels the mold plate $t$ with the plate $z$ and the extensions $y$ may be changed for similar parts of a different size.

The mold plate $v$ is removably secured to a plate $ee$ which is fastened by a pair of half collets $ff$ located in a groove $gg$ of the piston rod $i$, the collets $ff$ being suitably secured to the plate $ee$. The mold plate $v$ can readily be replaced with one of a different size if desired, and the mold band $p$ can likewise be changed. Thus whenever the piston rod $i$ moves, up or down, the mold plate $v$ moves.

The movement of the mold plates $t$ and $v$ is preferably limited to fixed distances. Thus I provide a pair of rods $hh$ secured to the plate $aa$ and passing through the plate $n$ which will contact the plate $ee$ to stop the mold plate $t$. Similarly, I provide a plurality of short rods $ii$ secured to the plate $ee$ which will engage the plate $n$ and stop the mold plate $v$. Since, during the pressing operation, the plates $aa$ and $ee$ are approaching each other, while the plate $n$ is stationary, the space between the ends of the rods $hh$ and the plate $ee$ is twice as long as the space between the rods $ii$ and the plate $n$.

I provide hydraulic pressure connections to operate this press and mold. As shown in Figure 1B, a pipe $jj$ which is connected to a source of fluid under pressure branches into pipes $kk$ and $ll$. The pipe $kk$ is connected by a four-way valve $mm$ to a pipe $nn$ which leads to the bottom of the cylinder $b$. The top of the cylinder $b$ is connected by a pipe $oo$ to a shut off valve $pp$ which is connected by a pipe $qq$ to the top of the cylinder $h$. The bottom of the cylinder $h$ is connected by a pipe $rr$ to a four-way valve $ss$ which is connected by a pipe $tt$ to an exhaust pipe $uu$. The top of the cylinder $b$ is further connected by a pipe $vv$ to a shut off valve $ww$ which is connected by a pipe $xx$ to the four-way valve $mm$. The top of the cylinder $h$ is further connected by a pipe $yy$ to a shut off valve $zz$ which is connected by a pipe $aaa$ to the four-way valve $ss$. The four-way valve $mm$ is further connected by a pipe $bbb$ to the exhaust pipe $uu$.

Figure 1B shows the mold band $p$ having been filled with a mixture of abrasive and vitrified bond 6 such as the free flowing plastic dry granular mix above described. With the various valves in the position shown the piston c will rise and the piston j will move down. These pistons and the mold plates t and v connected to them will move at exactly the same rate. Stated in another way, the upper face of the plate t and the lower face of the plate v will always be the same distance from a mid plane of the mold band p, which mid plane is half way between such faces at the start of the operation. Such mid plane is parallel to the faces of the plates t and v and is perpendicular to the axis of the mold. The reason why the pistons c and j will move at the same rate with the results indicated, is because the piston j is driven by fluid exhausted from the upper part of the cylinder b and the area of the piston j is equal to the area of the piston c minus the cross sectional area of the piston rod d.

Because a dry granular mix of abrasive and bond is not the same as a liquid, the pressure in any mold is different at different places. The internal friction of an ordinary dry granular mix of abrasive and vitrifiable bond is considerable. Using the mold of Figure 1A, and assuming that we are molding a wheel of substantial thickness, say one whose thickness is more than fifty times the average diameter of its abrasive grains, the results will be variable and the wheel will not be homogeneous. In general, using such a dry granular mix, the interior is always softer, that is it "grades softer." Furthermore the top of the wheel as molded will generally be harder (grade harder). This is because only the top plate 5 moves relative to the adjacent mass of the mix 6 and relative to the arbor 4.

On the other hand, using the apparatus of Figure 1B, both plates t and v move relative to the adjacent mass of the mix and relative to the arbor u. The motion of the mold plates relative to the mold band is also of importance where the wheel has a thickness which is of the same order of magnitude as its diameter, or a greater thickness. In the case of a conventional mold such as that of Figure 1A, the motion of the mold plates 5 relative to the mold band 3 is variable and indeterminate. Sometimes the mold band 3 drops down before pressing, sometimes it remains stationary until positively forced down by the upper platen 2 and stops 7 and sometimes it goes down at an indeterminate rate, due to the friction of the top part of the mix which is being pressed down. Often the stops 7 are omitted or arranged differently than shown in Figure 1A. But in the improved mold apparatus and method of Figure 1B, both of the plates t and v move relative to the adjacent mass of the mix and relative to the arbor u and relative to the mold band p and as they move their faces are always at equal distances from a given plane of the mold band p and of the arbor u. Such plane can be called a median plane and is perpendicular to the axes of the mold band p and of the arbor u. Thereby an equal pressing is achieved and the wheels will grade the same on the top side and on the bottom side (as molded). But, using an ordinary dry granular mix and the apparatus of Figure 1B, the wheels, if of substantial thickness, will nevertheless grade somewhat softer in the central planes perpendicular to their axes.

On the other hand, using the free flowing highly plastic dry granular mix herein described, the central planes (central portions measured along the axis) are almost as hard as the sides (top and bottom) of the wheels. This is because, the aforesaid mix, being free flowing fills the mold cavity evenly and the mix, being highly plastic behaves more nearly like a liquid under pressure. That is to say the plastic mix comes close to obeying Pascal's law. Hard spots, frequently found in wheels made from an ordinary dry granular mix, simply do not occur in wheels made from this free flowing highly plastic dry granular mix. Therefore, while excellent wheels are made using a molding apparatus of the type shown in Figure 1B and the ordinary dry granular mix, much superior wheels are made using the free flowing highly plastic dry granular mix herein described. And it is further pointed out that the deficiencies of molding with the conventional apparatus of Figure 1A are considerably minimized by the use of the free flowing highly plastic mix herein described, because the free flowing mix fills all parts of the mold to a uniform number of particles per unit volume and, during pressing, the mix, being highly plastic, acts more nearly like a liquid. However, when using molding machinery which is not automatic, the anti-sticking agent can be omitted since the mix having the wax as described is highly plastic.

After a green wheel is pressed in the mold of Figure 1B, it may readily be removed therefrom as follows: The valve pp should be closed to hold the piston c from further movement. The piston c has already been stopped by engagement of the rods hh with the plate ee, but the plate ee is going to be moved. Next the valve ss should be reversed and then the valve zz should be opened. This will reset piston j to the limit of its movement, therefore lifting the plate ee and the mold plate v. Now the valve pp should be opened which will cause the piston c to rise and the mold plate t will eject the pressed green wheel from the mold band p. This upward movement of the piston c carries the mold plate t to the level of the top of the ring q. The pressed wheel may now easily be removed from the apparatus with a pusher.

The next step is to reset the mold apparatus for filling. First the valves zz and pp should be closed to hold the piston j. Then the valve mm should be reversed and the valve ww opened. This will move the piston c downward a full stroke. The mold cavity in the mold band p may now be filled with a dry granular mix 6 which can be poured into place using a funnel with a bent spout. Now, to set the apparatus into the position of Figure 1B, close the valve pp or keep it closed, place the valve ss in the position shown in Figure 1B, and manipulate shut off valve zz to allow fluid to enter the upper part of the cylinder h until the mold plate v is about to enter the mold band p, as clearly shown in Figure 1B. Then, when all the valves are reset to the position shown in Figure 1B, another mixture 6 will be molded, which may then be stripped from the mold as already described. In this way quantities of green wheels are produced which, without drying, are ready to be vitrified in the kiln which will now be described.

Referring now to Figures 2, 3, 5, 11, 12, 13 and 14 the kiln, which is generally indicated by the number 20, is mounted on a plurality of legs 21 which may be made of steel. As shown, the kiln 20 has the shape of a parallelepiped which is rectangular in cross section, but the ends need not be perpendicular to the top and bottom of the kiln 20 since it is inclined to the horizontal. The pitch of this inclination was actually about one foot in twenty three, which is an angle of about 2° 28'. Preferably it should not be much less than say 2°, nor much greater than 8°. The purpose of the downward pitch, for in Figure 2 the right hand end of the kiln is the entrance end, is to drive more of the hot gases toward the entrance end of the kiln; some gases go to the annealing zone and this is desired.

Referring again to the aforementioned figures, the kiln may comprise sheet steel bottom plates 22, sheet steel top plates 23 and sheet steel side plates 24, all fastened together to form the elongated box like structure shown by means of many angle irons 25 as well as the upper portions of the legs 21 and tie rods 26, the foregoing metal parts being bolted together or welded together or partly bolted and partly welded as desired. Referring to Figure 3, an entrance end plate 30 partly covers the entrance end of the kiln and referring to Figure 7, an exit end plate 32 partly covers the exit end of the kiln; these plates likewise are preferably made of sheet steel and may be welded to angle irons 25; they do not cover the ends of the tunnel 35.

One of the features of the invention is the relatively small size of the kiln. While it may be profitably made in much larger sizes, the kiln actually built was 23 feet, 3 inches long, measured on the horizontal, and 2 feet 7 inches square in cross section measured between the insides of the sheet metal plates. The chief reason for the legs 21 was to place the tunnel 35 high enough for working convenience, the bottom of the exit end of the kiln being 2 feet above the floor and of the entrance end being 3 feet above the floor. This kiln can vitrify wheels up to eight inches in diameter and two inches thick. For larger wheels larger kilns should be constructed.

Still referring to the same figures, the kiln 20 contains a refractory lining which insulates and defines the tunnel 35. This lining may be constructed in a number of ways, but the illustrative embodiment herein described is highly practical, readily constructed and easily repaired. Thus I provide a refractory bottom formed of courses of bricks 40, refractory sides formed of courses of bricks 42, and a refractory top formed of courses of bricks 44. The bricks of these courses are preferably insulating bricks of any desired variety provided they are refractory enough to withstand the temperatures hereinafter mentioned. Silica bricks may be used with success.

I further provide a course of tunnel bottom bricks 46 having aligned pairs of rectangular grooves 48 in their upper surfaces thus forming at the bottom of the tunnel 35 a continuous groove on each side thereof extending from end to end of the tunnel, the grooves 48 being separated by ledge portions 50. I also provide a pair of courses of tunnel side bricks 52 which rest upon the sides of the tunnel bottom bricks 46 from the grooves 48 outwardly and upon these I mount a course of tunnel top bricks 54 which may have ceiling recesses 56 therein. The bricks 46, 52 and 54 may be made of the same material as the bricks 40, 42 and 44; they should be able to withstand the temperatures herein involved. The various bricks and courses of bricks may be secured to each other by suitable refractory cement such as 85% alumina fines with 15% ball clay, both to make the structure more rigid and to seal it better for retention of heat. Expansion gaps should be provided, and in Figures 3 and 5 I have shown gaps 58 and 59 between pairs of bricks 46 and also gaps 60 and 61 between sets of bricks 40. The several bricks of a given course are in general the same, but certain ones are drilled, others are cut away at certain places, and the end bricks may be mitered to fit the end plates 30 and 32 since the angles at the ends of the kiln are not right angles; the drawings clearly show these features and they will be more fully pointed out hereinafter. Between the side bricks 42 and the side plates 24 and between the top bricks 44 and the top plates 23 is a mass of loose refractory insulating material 63. I find that diatomaceous earth is satisfactory for this purpose.

Referring now to Figures 3, 5 and 7, the tunnel 35 of the kiln 20 has a preheating zone 65, a heating zone 66 and an annealing zone 67. As the green wheels enter and are moved through the tunnel 35 they first strike moderate heat, of the order of 200° C. at the entrance end, which is protected by an upper portal brick 70 and a lower portal brick 71 which are cemented to end bricks 54 and 46 respectively. Referring now to Figure 15, the temperature gradually rises as a green wheel moves through the preheating zone 65. The flat top of the curve is reached after the green wheel (ware) enters the heating zone 66. As shown this is about 1260° C. which is a practical temperature for the vitrification of the wheel under the special conditions involved which include a 46 inch heating zone and a speed of 23 feet 3 inches in 4 hours. The speed is practically 70 inches an hour. A particular piece of ware is consequently in the heating zone only about 40 minutes. The curve of Figure 15 likewise shows that the ware is subjected to a heat of 1200° C. and above for only about 46 inches which is 40 minutes of time. Vitrification at a top temperature of 1260° C. and for only 40 minutes at 1200° C. or above is extremely fast vitrification and is made possible by the features of the heating zone hereinafter described.

The preheating zone 65 is substantially 46 inches long, so the ware moves therethrough in about 40 minutes. Referring to the curve of Figure 15, the rate of temperature rise in the preheating zone is about 17.5° C. per minute. The temperature of the ware, of course, lags behind the temperature of the zone at any place, the ware starting at room temperature and being initially subject to a heat of 200° C., but the lag is not great due to the fact that thin batts are used and only a single layer of green wheels is placed on each batt in accordance with the preferred manner of using the kiln and carrying out the method of the invention. At all events preheating and vitrification heating at the rates and temperaures above specified can be successfully carried out in practice to produce vitrified grinding wheels which are not merely as good as but actually better than those heretofore made on a commercial scale.

The annealing zone is about 187 inches long which at 70" an hour represents about 2 hours and 40 minutes of time. From the curve of Figure 15 it will be seen that a very regular and even temperature drop occurs in this annealing zone. This produces a cooling of the ware at a steady rate, the ware of course being slightly hotter than the zone at any point. The ware reaches the exit end of the kiln at a temperature low enough (about 120° C.) so that there is no shock when it moves out into the room in which the kiln is located.

Referring now to Figures 11, 12, 13 and 14, I provide refractory supporting members 75 in the rectangular grooves 48 which collectively fill the corresponding groove 48 from end to end of the tunnel 35. Slight gaps are left between the members 75 for expansion. Each supporting member 75 has a V groove 76 in its top and bottom, the grooves on the bottom being chiefly to make these members symmetrical so that they will not warp during firing nor in use. In these V grooves 76 on the upper side I place refractory rods 77 which, as best shown in Figure 6, have tapered end portions 78. Referring now to Figures 6, 8 and 10 I provide ware carrying refractory batts 80 which are thin rectangular plates of refractory material having thickened ends 81 with grooves 82 on the under side extending across the batts and locating the batts on the rods 77. The upper side of each batt 80 is flat and has a layer 83 of silica. The sides of the batts 80 have respectively projections 84 and grooves 85 so that the batts are interlocked together in the tunnel 35. This keeps any batt from riding over the batt in front and also has other advantages which will be hereinafter pointed out.

The supporting members 75 and the rods 77 are preferably made of self bonded aluminum oxide. Thus they are highly refractory and resistant to wear. The batts 80 are preferably made of vitrified silicon carbide which is still more refractory and wear resistant. The silica layers 83 are formed by placing layers of silica cement on the batts and then vitrifying. These layers 83 prevent contamination of the ware, especially when the ware is made of aluminum oxide abrasive particles with ceramic bond as is frequently the case. The rods 77 are preferably ground to produce smooth accurate cylindrical surfaces and the grooves 76 are also preferably ground.

I have found that batts 80 having green wheels and partly vitrified wheels and vitrified wheels undergoing annealing in a long continuous line can be forced through the tunnel 35 by a thrust at the entrance end, and the batts stay in perfect alignment, nothing is broken and the ware is not disturbed in any way. The grooves in the batts 80 by coaction with the rods 77 help to maintain the batts parallel and in alignment. The thrust is intermittent and is applied to each batt as it enters the kiln—the new batt transmits the thrust to the next in line and so on, each batt transmitting the thrust to the one in front of it until the batt at the tunnel exit end is reached. This means of propelling batts through the tunnel 35 is entirely successful despite the fact that no rollers or metal parts are used. The tapered end portions 78 have proved effective in preventing the batts from catching on the rods 77 despite the fact that the rods are not continuous. These rods 77 can be replaced in the tunnel 35 even when the kiln is hot, for they can be pushed along the grooves 76 and will not catch in the joints between supporting members 75. Since the rods 77 are round they have many "sides" or areas for successively taking the wear, new areas being placed uppermost merely by turning the rods. an unexpected and surprising fact about the action of the batts 80 on the rods 77 is that the wearing of the rods 77 is greater in the annealing zone 67 than it is in the heating zone 66.

Referring now to Figure 12, I provide heating means in the heating zone 66 just below the batts 80 and just above the batts 80. While so far as certain features of the invention are concerned the heat might be provided by muffles above and below the ware, I prefer to use electrical resistors, such as in the form of long resistor rods 90 of silicon carbide preferably having "cold ends" 91, that is ends of high conductivity so that the energy will be supplied where it is needed, in the heating zone 66 of the tunnel 35. Silicon carbide resistor rods which can be heated to around 1400° C. and will last for a reasonable time at this temperature are available on the market. The use of these resistor rods or any other refractory electrical resistor rods of adequate life presents the advantage that the heat is developed right in the heating zone of the tunnel and, in combination with the supporting members 75 and rods 77 for supporting the batts, permits the heat to be developed virtually as closely as desired to the wheels 92 supported by the batts 80. Heat is radiated directly downward from the upper resistor rods 90 upon the green wheels 92, while heat is radiated directly upward from the lower resistor rods 90 upon the under sides of the batts 80 which, as will be readily seen, are comparatively thin. This radiated heat represents more British thermal units than convection heat. Thus the wheels 92 are vitrified by heat directed upon the sides of the wheels rather than upon the periphery as in tunnel kilns heretofore used for vitrifying grinding wheels. The result has been the manufacture, according to this invention, of vitrified grinding wheels with no strain and which have high strength both as regards rupturing point in surface feet per minute and impact resistance to side blows.

The resistor rods 90 have terminals 93 at the outer ends of their cold ends 91, which terminals 93 are outside of the side plates 24. They are connected by suitable wiring to a source of electrical energy of high power and the heating zone 66 is maintained at the desired temperature by electrical heat controlling apparatus controlled by a thermocouple 95. I will not describe the electro-thermal control means nor the thermocouples in detail since such are available on the market and are not per se the subject of this invention. However it may be noted that an electromotive force of 110 volts capable of delivering up to 30 kilowatts in three phase current was used, controlled from a Leeds and Northrup heat regulator by means of the thermocouple 95. Each resistor rod 90 was across one phase of the power. The actual voltage across each rod varies from 30 volts to about 110 volts depending on the age of the rod, and the usual power input for the total heating unit was around 18 kilowatts.

The radiant heat generated by the lower bank of resistor rods 90 passes rapidly through the batts 80 because they are made of silicon carbide which has relatively high heat conductivity. In order further to increase the rate of heat transfer, the batts 80 have a dense structure and are thin. They transfer heat more rapidly than the green wheels 92 which, being grinding wheels, are porous, and furthermore green ware transmits heat more slowly than vitrified ware. Therefore the lower sides of the wheels 92 can be, in this kiln, heated at practically the same rate as the upper sides of the wheels 92.

In the kiln of this invention wheels have been observed in the heating zone 66 to have red hot bottom faces and top faces, of the same degree of redness with a central zone of less redness, showing that the heat was transmitted in a uniform flow from top and bottom. Likewise, in the annealing zone 67 a red hot interior has been observed in the wheels with darker under-side and top side, the color of the top and bottom being the same. This evidence shows ideal heating and annealing in contradistinction to conditions previously met with involving temperature gradients radially of the wheels. In each of the above cases the color change from the outside to the inside was gradual.

Referring again to Figure 12, the resistor rods 90 are supported by refractory insulating sleeves 98 which extend through the side plates 24 and through the loose refractory insulating material 63 and into the kiln side bricks 42. In the heating zone 66 there are three courses of tunnel side bricks from top to bottom Figure 12, 52a, 52b and 52c on each side of the tunnel 35. The upper rods 90 extend through holes in the side bricks 42 and through holes in the tunnel side bricks 52a and then across the upper part of the tunnel 35 just below the tunnel top bricks 54. The lower rods 90 extend through holes in the side bricks 42 and through holes in the tunnel side bricks 52c and through oversize holes 109 in the refractory supporting members 75 and just above the tunnel bottom bricks 46, the ledge portions 59 being omitted in the heating zone 66. All of the members 75 may have holes 100 to reduce thermal strains. The boundaries between the cold ends 91 of the resistor rods 90 and the central heating portion 101 are indicated by vertical lines in Figure 12 from which it can be seen that the bricks contain only the cold ends 91 of the resistor rods 90. Also it will be seen that the central heating portions 101 of the resistor rods 90 extend practically from side to side of the rectangular (in cross section) heating zone of the tunnel 35.

It is thus possible to eliminate car wheels in the kiln and there are many advantages in so doing. In the first place it permits the lower rods 90 to be placed close to the bottoms of the batts 80, and in the second place everything in the heating zone 66 can be made of refractory material whereas the use of wheels usually involves either metal wheels, metal axles, metal bearings or metal sand seals or all of these. Furthermore the particular supporting means for the batts shown and described involving the refractory members 75 with grooves 76 and refractory rods 77 permits the batts 80 to be propelled through the tunnel 35 without any moving parts or other actuating mechanism therein other than the batts and ware which are propelled. This is a great advantage as it permits the construction of a compact kiln with a small volume heating zone 66. Large volume heating zones involve convection currents and undesired temperature differences. The present construction furthermore separates the various zones of the tunnel 35 including the heating zone 66 into two parts respectively above and below the batts (as parts 66a and 66b of zone 66, see Figure 12) for the members 75 extend from the rods 77 to the sides of the tunnel, the batts 80 extend from member 75 to member 75 and the batts are in contact with each other. This cuts down convection and gives controlled heating and vitrification. Furthermore, if desired, the part 66b of zone 66 can be heated hotter than the part 66a of zone 66 to compensate for the slower heat transfer through the batts 80 than by direct radiant heat.

Referring now to Figure 2, the angle irons 25 are cut away (on both sides of the kiln) at the heating zone 66 so that they will not interfere with the resistor rods 90, and longitudinal angle irons 25a are welded or fastened to the side plates 24 above and below the terminals 93 of the rods 90.

The wax and the lycopodium powder of the free flowing plastic dry granular mix are burned out during the passage of the wheels 92 through the preheating zone 65 and the heating zone 66. This organic material leaves no ash. In order to burn out the organic material air is introduced into the tunnel 35. In order to remove the gases of combustion and in order to maintain the temperature gradients in the tunnel 35 at or close to the gradient shown in the graph, Fig. 15, I provide ducts, piping and dampers.

Referring now to Fig. 2, a smoke stack 105 is provided which may extend upwardly through the roof of the building and it may have a rain cap 106. The smoke stack 105 is connected to a long, slanting pipe 107, which is located above the kiln 20, as shown. The particular arrangement adopted involves four feeder pipes 108, 109, 110 and 111. The feeder pipe 108 is connected to the tunnel 35 at the entrance end of the preheating zone 65. The feeder pipe 109 is connected to the tunnel 35 far out in the annealing zone, and the feeder pipes 110 and 111 are connected to the tunnel 35 near the exit end of the annealing zone 67.

Referring to Figs. 2 and 3, a damper 112 controls the flow of hot gases through the feeder pipe 108. Referring to Fig. 2, a damper 113 controls the flow of hot gases through the feeder pipe 109. Referring to Figs. 2 and 7, a damper 114 controls the flow of hot gases through the feeder pipe 110 and a damper 115 in the long pipe 107 controls the flow of gases from the feeder pipes 111.

Referring now to Fig. 11, which is a cross sectional view looking towards the entrance end of kiln 20, the feeder pipe 108 is connected to a large duct 116 which has legs 117 straddling the kiln 20, some of the side bricks 42 being omitted at this location and a pair of top bricks 44 being mitred as shown. This duct 116 and its legs 117 may be made of sheet steel. The legs 117 are connected to the upper level of the tunnel 35 by means of metal pipes 118, and to the midlevel of the tunnel 35 by metal pipes 119 and to the lower level of the tunnel 35 below the batts 80 by metal pipes 120. These metal pipes 118, 119 and 120 extend through holes in the bricks 54, 52 and 46 and, in the case of the pipes 120, also through holes in the refractory supporting members 75. It will thus be seen that the above construction provides for the exhaust of a considerable quantity of hot combustion gases and hot air from the heating zone 66 and preheating zone 65, but this exhaust is under control by means of the damper 112.

Referring now to Fig. 13, this illustrates the construction not only just below the feeder pipe 110 where the section is taken, but also just below the feeder pipe 109. A substantially vertical passage 122 is formed through each of the tunnel top bricks 54 at the two locations involved and connecting pipes 124 of metal are located in slots 125 in the bricks 44 connecting the vertical passages 122 to the feeder pipes 109 and 110. These vertical passages 122 extend from the upper middle of the tunnel 35, as clearly shown in Fig. 13. The passage 122 which leads to the feeder pipe 109 can remove some hot air and combustion gases, while the passage 122 which leads to the feeder pipe 110 can remove some hot gas, which is mostly air. In practice the damper 113 has been kept closed most of the time to maintain the desired temperature gradient, as shown in Fig. 15.

Referring now to Fig. 14, which is a cross sectional view looking toward the exit end of the kiln, the feeder pipes 111 extend vertically outside the kiln and are connected to the long, slanting pipe 107 by a horizontal overhead pipe 127 and are connected at their lower ends by a horizontal pipe 128 extending through the side plates 24, kiln side bricks 42 and a large groove in the tunnel bottom brick 46. The horizontal pipe 128 is cut away at the upper side between the supporting members 75 to allow hot air under the batts 80 to escape through pipe 128, feeder pipes 111 and horizontal overhead pipe 127 to the long slanting pipe 107 where the amount of air passing is controlled by the damper 115. Referring to Fig. 7, a thin brick 130 located on the tunnel bottom bricks 46 near the exit end of the tunnel 35 almost blocks off the tunnel 35 under the batts 80, so that control may be readily effected by the damper 115.

As heretofore stated, the entrance end of the tunnel 35 is protected by an upper portal brick 70 and a lower portal brick 71, which together reduce the size of the entrance end so that it provides clearance for the batts 80 and the ware thereon and not much more, and as there is (during operation) always a batt with ware in the entrance little heat escapes from the entrance end. At the exit end of the tunnel 35 there is similarly provided an upper portal brick 135 which, with the brick 130, pretty much closes the exit end of the tunnel leaving just enough room for the batts 80 and the ware thereon to emerge, and again a batt with ware on it is, during operation, partly blocking the orifice. Additionally a sliding door 137 made of iron may be adjustably positioned in a frame 138 by means of a handle 139 further to limit the orifice, or to enlarge it when larger wheels are being fired.

Referring to Figures 3 and 9 I provide a pair of refractory tubes 141 having one end closed but with angular slots 142 in one side which extend through the upper portal brick 70 into the tunnel 35 and are supported therein by refractory ledges 145. These tubes 141 are connected to hose pipes 146 which are connected to a source of air under pressure. Thus air is supplied to the preheating zone 65 to support combustion of the organic material in the green wheels. This supply of air is carefully regulated to maintain the desired temperature conditions in the preheating zone 65.

In order that the operator may have full information upon which to adjust the dampers and the supply of air, I provide a number of thermocouples 150 extending into the top and bottom of the tunnel 35. As shown in Figure 2 there may be 16 (more or less) of these, strategic locations therefor being indicated by the figure. Referring to Figures 3, 5 and 7 each top thermocouple 150 extends through a refractory tube 151 which extends a little way into a kiln top brick 44 and also through the kiln top plate 23; each top thermocouple also extends through bores in the kiln top bricks 44 and the tunnel top bricks 54. The bottom thermocouples 150 extend through bores in the bricks 40 and 46. Likewise peep holes 155 may be provided through the tunnel side bricks 52b, kiln side bricks 42 and side plates 24, with sleeves 156 extending from the plates 24 to the bricks 42, whereby the temperature of the firing zone 66 may be checked with an optical pyrometer. These peep holes 155 are closed by plugs 158 when not in use. The several thermocouples 150, or certain selected ones, may be connected to automatic recording apparatus, to provide a record of temperature at selected locations.

I provide a ram 159 to push the batts with a steady stroke of measured length. This ram may be operated by any suitable mechanism; I have found it convenient to employ a cylinder and piston unit using the city water supply for power.

Referring now to Figures 3 and 4, the ram 159 is a disc shaped piece of metal set on edge with part of the bottom cut off and having a screw threaded hub 170 by means of which it is screwed onto the threaded end 171 of a piston rod 173 which extends through a cylinder head 174 into a cylinder 175. The cylinder head 174 has a suitable stuffing box 176 to minimize leakage, which may be tightened by a stuffing box nut 177. The cylinder 175 is further provided with a solid cylinder head 178. Channels 179 and 180 in the heads 174 and 178 respectively admit and exhaust fluid (as water) to drive a piston 181 on the rod 173. This is the mechanism for intermittently propelling the batts 80 through the kiln 20. The actuation of the piston 181 will be later described.

The cylinder 175 may be supported in any suitable manner, but as herein shown a large box structure 185 made of sheet metal has a ledge 186 which supports the cylinder head 174 while a post 187 supports the cylinder head 178.

The box 185 is supported by legs 191 and besides supporting the cylinder head 174, it constitutes means for partially protecting the entrance end of the kiln from loss of heat. Access may be gained to it, however, by means of a door not shown in order to place a batt on a table 193 located in and fastened to the box 185.

It is contemplated that automatic mechanism may be provided to move the batts, one after another, at timed intervals, into position to be forced into the tunnel 35 by the ram 159. In a copending application I have fully disclosed such mechanism. However so far as the features of the kiln are concerned, the batts may be placed in front of the ram 159 in any manner, such as by hand, and I therefore herein disclose the table 193 which as shown in Figure 4 is equipped with an aligning stop 195 so that the batt can be placed square to the thrust of the ram 159 and in alignment with the batts already in the tunnel 35.

Still referring to Figure 3, a pair of bricks 200 are supported by the kiln 20 at the entrance end of the tunnel 35, and these bricks 200 support refractory members 75 which support rods 77 that extend well into the box 185. The table 193 extends to and between this first pair of rods 77, which pair is partly within the tunnel 35 and partly within the box 185. The surface of the table 193 is slightly inclined to the horizontal and it is below the plane defined by the tops of all the rods 77 to the extent of the depth of the grooves 82. As shown in Figure 4, the bottom of the ram 159 is practically in contact with the table 193. Each stroke of the ram 159 will advance the batts 80 in the tunnel 35 by the distance of the width of one batt regardless of the fact that the stroke of the ram 159 may be much greater than this distance, for the reason that the operator adds only one batt at a time to the train of batts in accordance with the preferred method of operating the kiln. Conversely if the operator should at any time place two batts upon the table 193, then the batts in the tunnel 35 would be advanced by a distance equal to the width of two batts.

In accordance with my copending application above referred to, it is contemplated that automatic apparatus will cause the ram 159 to be actuated at accurately timed intervals and in coordination with the batt feeding mechanism. However so far as the features of the kiln are concerned, the ram can be caused to move by manual control. As shown in Figure 3, water under pressure, derived from any suitable source, is conducted by a pipe 205 to a hand operated valve 206 and water may be exhausted from the system through the valve 206 to the sewer by way of a pipe 207. From the valve 206 a pipe 208 branches into a pair of pipes 209 and 210 in the first of which is a throttle valve 211 and in the second of which is a check valve 212. The pipes 209 and 210 merge into a pipe 213 which is connected to the channel 179. The valve 206 on the other side is directly connected to the channel 180 by means of a pipe 214. With the valve 206 in the position shown, the piston 181 is forced back in the cylinder 175 and the speed of the return stroke of the ram 159 caused by rearward motion of the piston 181 is unaffected by the throttle valve 211 because the fluid can pass through the check valve 212. When the valve 206 is turned the other way, fluid enters the cylinder 175 by way of the pipe 214, and the piston 181 is moved forward causing the ram 159 to contact and move a batt 80 on the table 193, and this motion is at a slow and controlled rate due to the fact that fluid exhausting from the channel 179 has to pass through the throttle valve 211.

When starting the kiln after it has been shut down and cooled off, it is best to feed it with batts 80 having dummy ware, meaning refractory pieces which have been fired. The dummy ware soaks up the heat and enables the operator gradually to bring the zones 65, 66 and 67 to the desired temperature gradients. If no dummy ware is used, the temperature gradients will change as the green ware is introduced. Dummy ware may consist of rectangular blocks of refractory material of about the same weight as a load of green ware and about the same specific heat. Once the temperature gradients are established the green ware may be fed to the kiln and will be given the proper heating cycle, and after about four hours all of the dummy ware is out. Every time a batt 80 is pushed into the tunnel 35 after it is full of batts, one is pushed out of the tunnel 35 at the exit end. Any suitable provision can be made for collecting the batts at the exit end of the kiln, and in my copending application there is disclosed a discharging conveyor for removing them from the line of batts. However they can be taken care of by means of a table 220 (Figure 7) supported by legs 221 and having rollers 222 so that the batts will simply move onto the table and can be moved along it by hand. The vitrified wheels 92 can be removed from shipment or storage at any time and the empty batts returned for reloading. The table 220 is convenient for holding hot batts and hot wheels until they have cooled sufficiently to be handled even without gloves. The table 220 preferably has bridging members 225 to space the gap between it and the end of the tunnel 35.

An important feature of the invention resides in the use of relatively narrow batts 80 (those used being three and three quarters inches wide, that is in the dimension lengthwise of the kiln) the gradual temperature gradients and the interlocking projections 84 and grooves 85 of the batts 80. Regular timed feeding of the batts will keep the various zones 65, 66 and 67 at the desired temperature gradients. It also assures that each piece of ware and each batt 80 will have the same heat treatment. Wide batts receive greater heat shock than narrow batts because they extend over a longer part of each zone. Refractory batts in general are rather subject to breakage from heat shock, but by using thin narrow ones I can operate this kiln with only an occasional batt breaking. This is where the interlocking of the batts is important, because by doing this with the projections 84 and grooves 85 I find that a batt or even two successive batts can fracture in the kiln without disrupting the operation. The broken batt or batts are held up by the interlocking and the pressure due to the friction between batts 80 and the rods 77 and the thrust imparted by the ram 159. I therefore find that the kiln operates well with each batt mounted for sliding involving a substantial amount of friction.

Referring to Figure 2, the electrical rod resistors 90 are in two banks or planes. Referring to Figure 12, the upper rod resistors 90 provide substantially a plane of radiant energy directed upon the upper faces of the wheels 92 whose axes are nearly vertical. In order that there shall be room for ware upon the batts the distance from the plane of the tops of the rods 77 to the plane of radiant energy should be no less than one quarter of the distance between the rods 77 and in order that the heat shall penetrate the wheels 92 rapidly this distance should be no greater than the distance between the rods 77 and preferably a good deal less as shown in Figure 12. The distance between the rods 77 (measured from center to center) is the same as the distance between the refractory supporting members 75 (measured between the apexes of the dihedral angles of the grooves 76).

On the other hand the rod resistors 90 should be located as close to the undersides of the batts 80 as possible consistent with mechanical strength of the refractory supporting members 75 and Figure 12 shows them substantially so located. It is preferred that they should be no lower than one half the distance between rods 77 below the plane of the rods. Actually they are much closer than this as shown in Figure 12.

The kiln of the invention is quite capable of vitrifying grinding wheels in more than a single layer of such wheels upon the batts 80, but for the production of the strongest grinding wheels there should be no more than a single layer of green wheels 92 placed upon the batts 80. Likewise, in order that the heat shall penetrate into the wheels and heat them uniformly they should be placed on the batts with a flat face on the batt, that is with their axes perpendicular to the batt.

The rates of heating and cooling are functions of the size of the wheels being vitrified and of the grit size of the abrasive grains of such wheels. However, and referring now to Figure 15, for wheels up to eight inches in diameter the rate of rise of temperature as the green wheels move through the preheating zone or area 65 should be from 200° C. to 900° C. in not less than 35 minutes. It is preferable that the rate of heating shall not vary more than 20% in any 10 minutes as compared with any other 10 minutes. The temperature rise from 900° C. to 1200° C. should take at least 12 minutes. The wheels should be maintained at above 1200° C. in the heating or vitrifying zone or area for at least 20 minutes and the wheels should be annealed in the annealing zone or area by causing them to cool from 1200° C. to 200° C. in not less than 100 minutes. It is also preferable that the rate of cooling in the annealing zone should not vary between any two periods of 10 minutes more than 20%. Operating with such a vitrifying cycle not only is a high rate of production achieved but very strong wheels without strain are produced. The graph of Figure 15 and the figures hereinbefore given show the preferred temperature gradients and peak temperature for wheels up to eight inches in diameter. For larger wheels the length of time that the wheels are in the respective zones will be greater, but for any given size of wheel the kiln of the present invention will vitrify the wheels in a very short time and the wheels will have no strains.

It will thus be seen that there has been provided by this invention grinding wheels of superior strength and a method of vitrifying grinding wheels and other ware in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. The method of making a grinding wheel which comprises mixing a quantity of refractory abrasive grain with a water emulsion of wax until each particle of the grain is coated with said wax emulsion, then adding a quantity of dry powdered vitrifiable bond of particle size very much smaller than that of the grain, further mixing the vitrifiable bond with the wax emulsion coated grain until the latter has picked up substantially all of the former, then drying the mix to eliminate the water down to about .5% of water as an upper limit, then screening the mix, then adding an anti-sticking agent and further mixing to coat the vitrifiable bond on the grain with said anti-sticking agent, thus producing a free flowing dry granular mix, placing a quantity of said mix in a mold comprising a round mold band and a pair of mold plates, pressing to cause said mold plates to approach each other while maintaining fixed points on said plates at equal distances from a given plane of the mold band, removing from the mold the pressed mix which is now a green wheel which is round by reason of said mold band being round and which green wheel therefore has a geometrical axis, then vitrifying said green wheel into a vitrified grinding wheel by sources of heat concentrated on opposite ends of the axis of said wheel to cause the heat to flow into the wheel in an axial direction from each axial end thereof which is from opposite sides of the wheel considered as a disc, and annealing the wheel.

2. The method of making a grinding wheel which comprises mixing a quantity of refractory abrasive grain with a water emulsion of wax until each particle of the grain is coated with said wax amulsion, then adding a quantity of dry powdered vitrifiable bond of particle size very much smaller than that of the grain, further mixing the vitrifiable bond with the wax emulsion coated grain until the latter has picked up substantially all of the former, then drying the mix to eliminate the water down to about .5% of water as an upper limit, then screening the mix, then adding an anti-sticking agent and further mixing to coat the vitrifiable bond on the grain with said anti-sticking agent, thus producing a free flowing dry granular mix, placing a quantity of said mix in a round mold, pressing the mix in the mold, removing from the mold the pressed mix which is now a green wheel which is round by reason of said mold being round which green wheel therefore has a geometrical axis, then vitrifying said green wheel into a vitrified grinding wheel by sources of heat concentrated on opposite ends of the axis of said wheel to cause the heat to flow into the wheel in an axial direction from each axial end thereof which is from opposite sides of the wheel considered as a disc, and annealing the wheel.

3. The method of making a grinding wheel which comprises mixing a quantity of refractory abrasive grain with a water emulsion of wax until each particle of the grain is coated with said wax emulsion, then adding a quantity of dry powdered vitrifiable bond of particle size very much smaller than that of the grain, further mixing the vitrifiable bond with the wax emulsion coated grain until the latter has picked up substantially all of the former, then drying the mix to eliminate the water down to about .5% of water as an upper limit, then screening the mix, then adding an anti-sticking agent and further mixing to coat the vitrifiable bond on the grain with said anti-sticking agent, thus producing a free flowing dry granular mix, placing a quantity of said mix in a mold comprising a mold band and a pair of mold plates, pressing to cause said mold plates to approach each other while maintaining fixed points on said plates at equal distances from a given plane of the mold band, removing from the mold the pressed mix which is now a green wheel, and vitrifying the wheel.

4. The method of producing a disc shaped vitrified grinding wheel with no strain and grading the same on each side which comprises coating a quantity of refractory abrasive grains with wax in a sticky state, adding powdered vitrifiable bond to said abrasive grains coated with sticky wax and mixing whereby each grain becomes coated with a mixture of wax and powdered bond, adding an anti-sticking agent to the coated abrasive grains and further mixing, placing a quantity of the resulting mix in a mold comprising a pair of mold plates in a round mold band, compressing said mold to cause said plates to move towards each other in the mold band while given points on the respective plates are always at equal distances from a mid-plane of the mold band, removing the green wheel from the mold, firing the green wheel by heat directed at opposite sides thereof in substantially equal thermal units of heat for given periods of time, then annealing the wheel by allowing the heat to leave the wheel from the sides thereof.

5. The method of producing a disc shaped vitrified grinding wheel with no strain and grading the same on each side which comprises coating a quantity of refractory abrasive grains with a water emulsion of wax, adding powdered vitrifiable bond to said abrasive grains coated with the water emulsion of wax and mixing whereby each grain becomes coated with a mixture of water emulsion of wax and powdered bond, heating the mixture to drive off the water down to about .5% of water as an upper limit, adding an anti-sticking agent to the coated abrasive grains and further mixing, placing a quantity of the resulting mix in a mold comprising a pair of mold plates in a round mold band, compressing said mold to cause said plates to move towards each other in the mold band while given points on the respective plates are always at equal distances from a mid-plane of the mold band, removing the green wheel from the mold, firing the green wheel by heat directed at opposite sides thereof in substantially equal thermal units of heat for given periods of time, then annealing the wheel by allowing the heat to leave the wheel from the sides thereof.

6. Method of making grinding wheels and the like which comprises providing a quantity of abrasive grain, coating each granule of the abrasive grain with an envelope of vitrifiable bond in powdered form and wax thus producing a dry granular mix, filling a mold with a quantity of such dry granular mix, pressing the contents of said mold therein, stripping said mold and thus producing a "green" article, without drying said "green" article introducing it into a kiln and in said kiln heating said article by heat directed both from above and from below said article, thus vitrifying it, and annealing said article, whereby a strong fired article without strains is produced.

7. The method of making a grinding wheel which comprises mixing a quantity of refractory abrasive grain with a water emulsion of wax until each particle of the grain is coated with said wax emulsion, then adding a quantity of dry powdered vitrifiable bond of particle size very much smaller than that of the grain, further mixing the vitrifiable bond with the wax emulsion coated grain until the latter has picked up substantially all of the former, then drying the mix to eliminate the water down to about .5% of water as an upper limit, then screening the mix, thus producing a highly plastic dry granular mix, placing a quantity of said mix in a mold comprising a round mold band and a pair of mold plates, pressing to cause both of the mold plates to be moved relative to the adjacent mass of the mix, removing from the mold the pressed mix which is now a green wheel which is round by reason of said mold band being round, and which green wheel therefore has a geometrical axis, then vitrifying said green wheel into a vitrified grinding wheel by sources of heat concentrated on opposite ends of the axis of said wheel to cause the heat to flow into the wheel in an axial direction from each axial end thereof which is from opposite sides of the wheel considered as a disc, and annealing the wheel.

8. The method of making a grinding wheel which comprises mixing a quantity of refractory abrasive grain with a water emulsion of wax until each particle of the grain is coated with said wax emulsion, then adding a quantity of dry powdered vitrifiable bond of particle size very much smaller than that of the grain, further mixing the vitrifiable bond with the wax emulsion coated grain until the latter has picked up substantially all of the former, then drying the mix to eliminate the water down to about .5% of water as an upper limit, then screening the mix, thus producing a highly plastic dry granular mix, placing a quantity of said mix in a mold comprising a mold band and a pair of mold plates, pressing to cause both of the mold plates to be moved relative to the adjacent mass of the mix, removing from the mold the pressed mix which is now a green wheel, and vitrifying the wheel.

9. The method of producing a cylindrical vitrified grinding wheel with no strain and grading the same on each side which comprises coating a quantity of refractory abrasive grains with wax in a sticky state, adding powdered vitrifiable bond to said abrasive grains coated with sticky wax and mixing whereby each grain becomes coated with a mixture of wax and powdered bond, placing a quantity of the resulting mix in a mold comprising a pair of mold plates in a mold, pressing said plates to cause both of the mold plates to be moved relative to the adjacent mass of the mixture, removing the green wheel from the mold, firing the green wheel by heat directed at opposite sides thereof in substantially equal thermal units of heat for given periods of time, then annealing the wheel by allowing the heat to leave the wheel from the flat faces thereof.

10. The method of producing a cylindrical vitrified grinding wheel with no strain and grading the same on each side which comprises coating a quantity of refractory abrasive grains with a water emulsion of wax, adding powdered vitrifiable bond to said abrasive grains coated with the water emulsion of wax and mixing whereby each grain becomes coated with a mixture of water emulsion of wax and powdered bond, heating the mixture to drive off the water down to about .5% of water as an upper limit, placing a quantity of the resulting mix in a mold comprising a pair of mold plates in a mold, pressing to cause both of the mold plates to be moved relative to the adjacent mass of the mixture, removing the green wheel from the mold, firing the green wheel by heat directed at opposite sides thereof in substantially equal thermal units of heat for given periods of time, then annealing the wheel by allowing the heat to leave the wheel from the flat faces thereof.

11. The method of making a grinding wheel which comprises mixing a quantity of refractory abrasive grain with a water emulsion of wax until each particle of the grain is coated with said wax emulsion, then adding a quantity of dry powdered vitrifiable bond of particle size very much smaller than that of the grain, further mixing the vitrifiable bond with the wax emulsion coated grain until the latter has picked up substantially all of the former, then drying the mix to eliminate the water down to about .5% of water as an upper limit, then screening the mix, thus producing a free flowing dry granular mix, placing a quantity of said mix in a round mold, pressing the mix in the mold, removing from the mold the pressed mix which is now a green wheel which is round by reason of said mold being round which green wheel therefore has a geometrical axis, then vitrifying said green wheel into a vitrified grinding wheel by sources of heat concentrated on opposite ends of the axis of said wheel to cause the heat to flow into the wheel in an axial direction from each axial end thereof which is from opposite sides of the wheel considered as a disc, and annealing the wheel.

12. Method of making disc shaped grinding wheels which comprises providing a quantity of abrasive grain, coating each granule of the abrasive grain with an envelope of vitrifiable bond in powdered form and wax thus producing a granular mix, placing a quantity of such mix in a mold, pressing the mix in the mold, removing the pressed wheel from the mold, then vitrifying said wheel by heat directed evenly onto opposite sides of said wheel.

13. Method of making disc shaped grinding wheels which comprises providing a quantity of abrasive grain, coating each granule of the abrasive grain with an envelope of vitrifiable bond in powdered form and wax, coating each envelope with an anti-sticking agent thus producing a granular mix, placing a quantity of such mix in a mold having mold plates, pressing said mix in the mold while moving each of the mold plates against the adjacent mass of the mix, removing the pressed wheel from the mold and firing it to vitrify the bond.

14. Method of making disc shaped grinding wheels which comprises providing a quantity of abrasive grain, coating each granule of the abrasive grain with an envelope of vitrifiable bond in powdered form and wax, coating each envelope with an anti-sticking agent thus producing a granular mix, placing a quantity of the mix in a mold, pressing the mix in the mold, removing the pressed wheel from the mold, then vitrifying said wheel by heat directed evenly onto opposite sides of said wheel.

15. Method of making disc shaped grinding wheels which comprises providing a quantity of abrasive grain, coating each granule of the abrasive grain with an envelope of vitrifiable bond in powdered form and wax thus producing a granular mix, placing a quantity of such mix in a mold having mold plates, pressing said mix in the mold while moving each of the mold plates against the adjacent mass of the mix, removing the pressed wheel from the mold, then firing said wheel to vitrify the bond.

16. Method of making grinding wheels and the like which comprises providing a quantity of abrasive grain, coating each granule of the abrasive grain with an envelope of vitrifiable bond in powdered form and wax, said bond being well dispersed in said wax, and an outer coating of anti-sticking agent thus producing a dry granular mix having the property of improved and substantially uniform flow when subjected to pressure, charging said mix into a mold having opposed movable mold plates between which the contents of the mold may be subjected to pressure, pressing the contents of said mold by controlled movement of said mold plates toward each other in substantially equal increments of movement and thereby compacting the granular mix into a "green" article having the property of substantially uniform heat conductivity in directions from the face thereof formed at one mold plate to the face thereof formed at the other mold plate, stripping the "green" article from the mold, vitrifying the pressed article by directing heat evenly and at substantially the same rate into it from and through both of said opposed faces thereof whereby the heating of said pressed article to vitrifying temperature progresses evenly from each of said faces toward the mid-plane therebetween, and then annealing the article by allowing the heat to leave it evenly and at substantially the same rate from each of said opposed faces thereof, whereby detrimental strain-producing temperature gradients in directions parallel to either of said faces are substantially avoided.

17. Method of making grinding wheels and the like which comprises providing a quantity of abrasive grain, coating each granule of the abrasive grain with an envelope of vitrifiable bond in powdered form and wax, said bond being well dispersed in said wax, and an outer coating of anti-sticking agent thus producing a dry granular mix having the property of improved and substantially uniform flow when subjected to pressure, charging said mix into a mold having opposed movable mold plates between which the contents of the mold may be subjected to pressure, pressing the contents of said mold by controlled movement of said mold plates toward each other in substantially equal increments of movement and thereby compacting the granular mix into a "green" article having the property of substantially uniform heat conductivity in directions from the face thereof formed at one mold plate to the face thereof formed at the other mold plate, removing the pressed "green" article from the mold, preparing it for heat treatment and also guarding against producing detrimental internal strains therein by placing it flatwise on a flat support of good heat conductivity and capable of withstanding a temperature higher than vitrifying temperature, and vitrifying the supported "green" article by directing heat into it evenly through said support and the face thereof toward said support and also through the opposite face thereof at respective intensities to progress the heating of said "green" wheel to vitrifying temperature evenly from each of said faces toward the mid-plane of the article.

18. Method of making grinding wheels or like ware that have opposed faces which comprises providing a quantity of abrasive grain, coating the granules of the abrasive grain with an envelope of vitrifiable bond in powdered form and wax thus producing a granular mix, successively placing substantially equal amounts of said mix in a mold, pressing each amount of mix in the mold and all of them, successively, to substantially the same volume, after each pressing removing the resultant pressed wheel from the mold, thereby producing a succession of equi-dimensioned "green" wheels, preparing the said "green" wheels for heat treatment by placing them flatwise on a succession of relatively thin batts of good heat conductivity, and vitrifying the said "green" wheels by directing heat into them and each of them indirectly through the supporting batt and directly through the opposite side of each "green" wheel at respective intensities to progress the heating of each "green" wheel to vitrifying temperature substantially evenly from each of its opposed faces toward the mid-plane between them.

19. Method of making grinding wheels or like ware that have opposed faces which comprises providing a quantity of abrasive grain, coating the granules of the abrasive grain with an envelope of vitrifiable bond in powdered form and wax thus producing a granular mix, successively placing substantially equal amounts of said mix in a mold, pressing each amount of mix in the mold and all of them, successively, to substantially the same volume, after each pressing removing the resultant pressed wheel from the mold, thereby producing a succession of equi-dimensioned "green" wheels, preparing the said "green" wheels for heat treatment by placing them flatwise on a succession of relatively thin batts of good heat conductivity, and passing said batts with said "green" wheels thereon successively through a pre-heating zone, a vitrifying zone, and an annealing zone, and maintaining in each of said zones two opposed temperature gradients in relation respectively to the unsupported face of the wheels on said batts and the free faces of said batts to flow heat into each wheel that is in the pre-heating zone and each wheel that is in the vitrifying zone through its opposed faces at substantially the same rate whereby heating progresses substantially evenly toward the mid-plane of each wheel and to withdraw heat from each wheel that is in the annealing zone at substantially the same rate from each of its opposed faces, whereby strong fired articles without strains are produced.

20. Method of making grinding wheels or like ware having opposed sides which comprises providing a quantity of abrasive grain, coating each granule of the abrasive grain with an envelope of vitrifiable bond in powdered form and wax thus producing a granular mix, placing a quantity of such mix in a mold having opposed movable mold plates, pressing the mix in the mold by moving said two opposed mold plates towards each other in equal increments of simultaneous movement to compact the mix into a "green" pressed wheel that is structurally homogeneous throughout and thereby facilitates substantially uniform heat flow in the direction from the face formed at one mold plate toward the face formed at the other mold plate, removing the pressed wheel from the mold, and vitrifying the pressed wheel by simultaneously directing heat evenly into and through each of the opposed sides of the wheel and at substantially the same rate, thereby to progress heat at vitrifying temperature evenly from each of said sides toward the midplane between them, thereby also avoiding the producing of detrimental strain-producing radially extending temperature gradients in the wheel.

21. Method of making vitrified-bonded grinding wheels and like refractory products out of suitable refractory grain which comprises providing a quantity of hard refractory grain of selected grit size of granules and a quantity of vitrifiable bond in powdered form of particle size much smaller than the size of granules of the refractory grain, preparing them for pressure molding and for vitrification by coating each hard granule with a relatively thick envelope of wax that has distributed throughout its mass the fine particles of the powdered vitrifiable bond and which envelope is yieldable under substantial pressure whereby for each refractory granule a composite enlarged granular entity is produced having the hard refractory granule at its core and then screening the same, thereby producing composite granular entities that are of substantially uniform size and that settle, when poured, into a substantially homogeneous mass; pouring equal volume amounts of said substantially uniformly sized composite granules successively into the mold cavity of a mold, which has side walls and top and bottom mold plates, to settle therein in a mass that is homogeneous and pressing each amount in the mold by forcing at least one of said mold plates toward the other to form opposed faces in the pressed mass and to cause the aforesaid envelopes to yield under the pressure and to bind the refractory core granules together by flow of the bond-containing wax of the envelope of one core granule into that of adjacent core granules and in that manner pressing all of the mold charges successively and each to the same extent; after each pressing, removing the pressed green article, thereby producing a succession of identically dimensioned and shaped articles all of which have the same internal structural characteristics; heating the articles to vitrifying temperature to vitrify the bond particles and bond the refractory granules together by directing heat evenly into the side faces of the article; and then annealing.

22. Method of making vitrified-bonded grinding wheels and like refractory products out of suitable refractory grain which comprises providing a quantity of hard refractory grain of selected grit size of granules and a quantity of vitrifiable bond in powdered form of particle size much smaller than the size of granules of the refractory grain, preparing them for pressure molding and for vitrification by coating each hard granule with a relatively thick envelope of wax that has distributed throughout its mass the fine particles of the powdered vitrifiable bond and which envelope is yieldable under substantial pressure whereby for each refractory granule a composite enlarged granular entity is produced having the hard refractory granule at its core and then screening the same, thereby producing composite granular entities that are of substantially uniform size and that settle, when poured, into a substantially homogeneous mass; pouring equal volume amounts of said substantially uniformly sized composite granules successively into the mold cavity of a mold, which has side walls and top and bottom mold plates, to settle therein in a mass that is homogeneous and pressing each homogeneously settled amount in the mold by moving said mold plates toward each other in equal increments of simultaneous movement to exert uniformly distributed equal opposed forces of compression at both top and bottom of the homogeneous mass of composite granular entities and thereby maintain substantial homogeneity of the mass as its volume is diminished by the pressure and thereby also to cause the wax of the aforesaid envelope, with the fine vitrifiable bond material carried thereby, of one composite granular entity to yield and merge into that of adjacent entities and thereby temporarily bind all of the core granules together into a green article that is homogeneous in internal structure and density, and, in that manner, pressing all of the mold charges successively, each to the same extent; after each pressing, removing the pressed article, thereby producing a succession of uniformly dimensioned and shaped articles having substantially the same homogeneity in that the internal structural relationships amongst their hard refractory granules are substantially identical, whereby also said articles have substantially the same and also uniform heat permeability, particularly from opposed faces of each inwardly; subjecting them to vitrifying heat by directing heat evenly and from opposite directions into each through the opposed faces thereof and at substantially the same rate; and then annealing.

23. A dry granular mix comprising particles of hard refractory material each coated with a great number of very fine particles of vitrifiable bond mixed with wax, the bond and wax forming an envelope which surrounds a particle, each particle of refractory material having such envelope, and a coating of anti-sticking agent which is a fine non-cohesive powder the particles of which will not stick to each other nor to parts of a machine but which is adhesive to the wax, on each such envelope.

24. A dry granular mix according to claim 23 in which the anti-sticking agent is lycopodium powder.

25. A dry granular mix according to claim 23 in which the anti-sticking agent is aluminum powder.

26. A dry granular mix according to claim 23 in which the anti-sticking agent is graphite.

27. A pressed "green" unfired ceramic body which is integral for handling and which comprises a great number of particles of refractory abrasive grain, each particle coated with an envelope of powdered vitrifiable bond mixed with wax and an anti-sticking agent which is a fine non-cohesive powder the particles of which will not stick to each other nor to parts of a machine but which is adhesive to the wax, and the envelopes being stuck together adhesively by said wax to make said body integral.

28. A pressed "green" unfired ceramic body according to claim 27 in which the anti-sticking agent is lycopodium powder.

29. A pressed "green" unfired ceramic body according to claim 27 in which the anti-sticking agent is aluminum powder.

30. A pressed "green" unfired ceramic body according to claim 27 in which the anti-sticking agent is graphite.

31. The method of making a dry granular mix for the subsequent manufacture of vitrified products which comprises coating each particle of a quantity of refractory abrasive grain with dry powdered vitrifiable bond and wax to form an envelope thereof on each such particle, and then mixing said particles of grain having such envelopes with an anti-sticking agent which is a fine non-cohesive powder the particles of which will not stick to each other nor to parts of a machine but which is adhesive to the wax, to coat each such envelope with said anti-sticking powder.

32. The method of making a dry granular mix according to claim 31 in which the anti-sticking agent is lycopodium powder.

33. The method of making a dry granular mix according to claim 31 in which the anti-sticking agent is aluminum powder.

34. The method of making a dry granular mix according to claim 31 in which the anti-sticking agent is graphite.

WALLACE L. HOWE.

REFERENCES CITED

The following references are of record in the file of this patent:

UNITED STATES PATENTS

| Number | Name | Date |
|---|---|---|
| 1,155,358 | Hulbert | Oct. 5, 1915 |
| 1,687,770 | Hutto | Oct. 16, 1928 |
| 1,791,234 | Cable | Feb. 3, 1931 |
| 1,859,227 | Willetts | May 17, 1932 |
| 1,936,820 | Benner et al. | Nov. 28, 1933 |
| 1,991,706 | Seabury | Feb. 19, 1935 |
| 2,007,742 | Brown | July 9, 1935 |
| 2,043,086 | Westin et al. | June 2, 1936 |
| 2,053,146 | Harvey et al. | Sept. 1, 1936 |
| 2,069,788 | Van der Pyl | Feb. 9, 1937 |
| 2,073,590 | Sanford | Mar. 9, 1937 |
| 2,076,833 | Webster | Apr. 19, 1937 |
| 2,084,534 | Martin | June 22, 1937 |
| 2,150,034 | Melton et al. | Mar. 7, 1939 |
| 2,218,935 | Ingersoll | Oct. 22, 1940 |
| 2,260,456 | Johnson | Oct. 28, 1941 |
| 2,326,391 | Milligan et al. | Aug. 10, 1943 |